(12) United States Patent
Mercando et al.

(10) Patent No.: US 9,549,051 B2
(45) Date of Patent: Jan. 17, 2017

(54) MOBILE COMMUNICATION DEVICES

(71) Applicant: Ringly Inc., New York, NY (US)

(72) Inventors: Christina Mercando, New York, NY (US); Logan Munro, New York, NY (US); Antonio Cerruto, New York, NY (US); Matt Gattis, New York, NY (US)

(73) Assignee: Ringly Inc., New York, NY (US)

( * ) Notice: Subject to any disclaimer, the term of this patent is extended or adjusted under 35 U.S.C. 154(b) by 0 days.

(21) Appl. No.: 14/763,182

(22) PCT Filed: Feb. 24, 2014

(86) PCT No.: PCT/US2014/018018
§ 371 (c)(1),
(2) Date: Jul. 24, 2015

(87) PCT Pub. No.: WO2014/130946
PCT Pub. Date: Aug. 28, 2014

(65) Prior Publication Data
US 2015/0358444 A1 Dec. 10, 2015

Related U.S. Application Data

(60) Provisional application No. 61/769,009, filed on Feb. 25, 2013.

(51) Int. Cl.
*H04M 1/02* (2006.01)
*H02J 7/00* (2006.01)
(Continued)

(52) U.S. Cl.
CPC .......... *H04M 1/0283* (2013.01); *A44C 9/0084* (2013.01); *A44C 15/0015* (2013.01); *H02J 7/0042* (2013.01); *H02J 7/0044* (2013.01); *H02J 7/025* (2013.01); *H02J 7/328* (2013.01); *H04B 1/3827* (2013.01); *H04B 1/3883* (2013.01);
(Continued)

(58) Field of Classification Search
CPC .................................................... H04M 1/0283
See application file for complete search history.

(56) References Cited

U.S. PATENT DOCUMENTS 6,954,659 B2 10/2005 Tushinsky et al.
7,203,524 B2 4/2007 Tushinsky et al.
(Continued)

FOREIGN PATENT DOCUMENTS

WO 2008/002027 A1 1/2008
WO 2008/025058 A1 3/2008

OTHER PUBLICATIONS

International Search Report, PCT/2014/018018, Aug. 19, 2014 (14 pages).
(Continued)

*Primary Examiner* — Tuan H Nguyen
(74) *Attorney, Agent, or Firm* — Dorf & Nelson LLP; Scott D. Locke, Esq.

(57) ABSTRACT

A mobile communication device that comprises a fashion accessory and a signaling assembly is provided. The signaling assembly may be configured to provide sensory stimuli such as a flashing LED light and a vibration. These stimuli may vary depending on the signal received from a remote communication device or from gestures made by a user or from information stored in the mobile communication device.

20 Claims, 8 Drawing Sheets

(51) Int. Cl.
*H04B 1/3827* (2015.01)
*H04W 4/00* (2009.01)
*H04B 5/00* (2006.01)
*H04B 1/3883* (2015.01)
*H02J 7/32* (2006.01)
*H02J 7/02* (2016.01)
*H04M 1/725* (2006.01)
*H04M 19/04* (2006.01)
*A44C 9/00* (2006.01)
*A44C 15/00* (2006.01)

(52) U.S. Cl.
CPC ......... *H04B 5/0037* (2013.01); *H04M 1/7253* (2013.01); *H04M 19/04* (2013.01); *H04W 4/008* (2013.01); *H02J 2007/0096* (2013.01); *H04M 1/72597* (2013.01)

(56) References Cited

U.S. PATENT DOCUMENTS

| | | | |
|---|---|---|---|
| 8,279,609 B2 | 10/2012 | Rossi | |
| 8,421,607 B2 | 4/2013 | Mahoney | |
| 8,725,216 B2 | 5/2014 | Gilbert et al. | |
| 8,923,804 B1 | 12/2014 | Aldridge, II et al. | |
| 2007/0026798 A1 | 2/2007 | Hoogstra | |
| 2007/0182524 A1 | 8/2007 | Tushinsky et al. | |
| 2007/0249196 A1 | 10/2007 | Collins et al. | |
| 2009/0196124 A1 | 8/2009 | Mooring | |
| 2010/0268056 A1 | 10/2010 | Picard et al. | |
| 2012/0169486 A1* | 7/2012 | Sweeney ............... | H04M 19/04 340/384.1 |
| 2012/0184367 A1* | 7/2012 | Parrott .................... | G06F 1/163 463/31 |
| 2012/0206301 A1* | 8/2012 | Flores-Cuadras ...... | H01Q 1/243 343/700 MS |
| 2012/0329447 A1 | 12/2012 | Gilbert et al. | |
| 2013/0074543 A1* | 3/2013 | Vahid .................... | A44C 15/00 63/1.11 |
| 2015/0289227 A1 | 10/2015 | Becker et al. | |

OTHER PUBLICATIONS

European Patent Office, Supplementary European Search Report, EP 14 75 4372, 10 pages, Sep. 19, 2016.

* cited by examiner

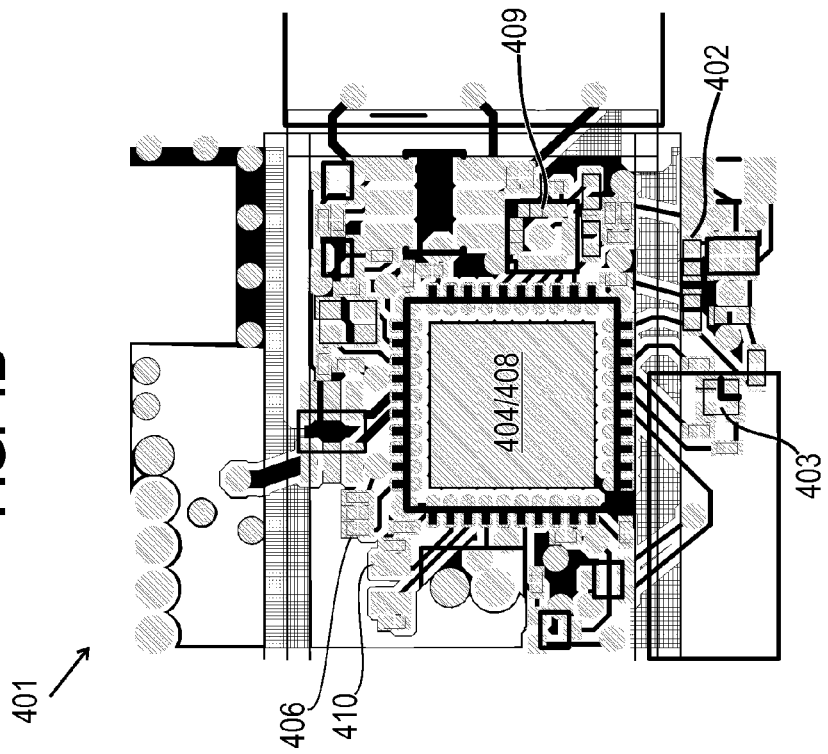
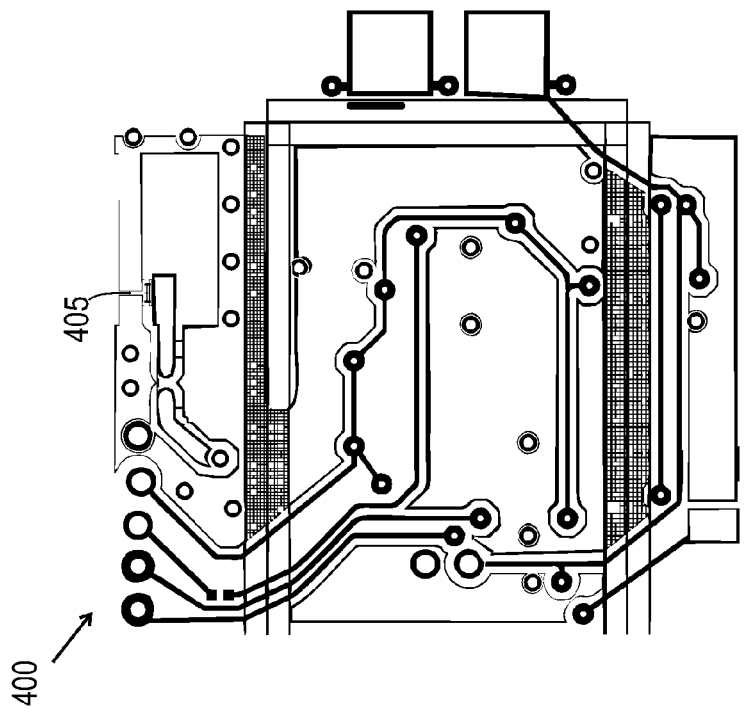

MOBILE COMMUNICATION DEVICES

CROSS-REFERENCE TO RELATED APPLICATION

This application is a national stage application of PCT/US2014/018018, filed Feb. 24, 2014, which claims the benefit of the filing date of U.S. Provisional Application Ser. No. 61/769,009, filed Feb. 25, 2013, the entire disclosures of which are incorporated by reference as if set forth fully herein.

FIELD OF THE INVENTION

The present invention relates to the field of wireless devices.

BACKGROUND OF THE INVENTION

Mobile communication devices such as smartphones and personal digital assistants have become commonplace in the twenty-first century. People rely on these devices to communicate with business associates, friends and family, and society has recognized that they are an integral part of the ways in which people do and will continue to connect with each other.

At the same time, there is recognition that in certain situations overt displays of these types of devices can be distracting, disrespectful to others or otherwise undesirable. For example, the vibration of a smartphone on a conference table during a meeting and the ringing of a device during a movie are occurrences upon which society frowns, despite the recognition that most people at meetings and leisure activities carry with them at least one mobile device that is capable of communicating with remote parties.

Moreover, in certain situations, even when no communications are being received, a person may feel compelled to check his or her device for messages, which can be considered disrespectful to other people who are in the presence of that person. Furthermore, the mere clutching of a mobile device while in the physical presence of other persons can be distracting to others or cumbersome to the owner. Still further, many owners elect to keep their mobile devices in a bag such as a purse or a briefcase, or in a holster or a pocket, but when doing so, they run risk of missing one or more communications because they do not hear the ring or feel the vibration. Thus, there is a need for new ways and new technologies for persons to be notified of communications on their wireless devices while minimizing the need to hold or to be immediately proximate to them.

SUMMARY

Various embodiments of the present invention provide mobile communication devices, methods for using these devices and systems that incorporate these devices. These devices may, for example, be designed to be worn by a person or to adorn a person's clothing. Through various embodiments of the present invention one can accomplish one or more of the goals of maintaining accessibility to remote third-parties while minimizing the need to retain physical contact with, or in some embodiments, even close proximity to one's own smartphone or other computing device; and extending the functionality of a smartphone to a person's body parts.

According to a first embodiment, the present invention provides a mobile communication device comprising: (a) a fashion accessory; and (b) a signaling assembly, wherein the signaling assembly is housed within or affixed to the fashion accessory, is capable of generating a plurality of different sensory stimuli, wherein the different sensory stimuli are based on receipt of different signals from a remote transmitting device, and wherein at least one of the sensory stimuli is a visual display.

According to a second embodiment, the present invention provides a mobile communication device comprising: (a) a fashion accessory; and (b) a signaling assembly, wherein the signaling assembly is housed within or affixed to the fashion accessory, is capable of generating a plurality of different sensory stimuli, wherein the different sensory stimuli are based on receipt of different signals from a remote transmitting device, and wherein at least one of the sensory stimuli is a tactile sensation.

According to a third embodiment, the present invention provides a mobile communication device comprising: (a) a fashion accessory; and (b) a signaling assembly, wherein the signaling assembly is housed within or affixed to the fashion accessory, is capable of generating a plurality of different sensory stimuli, wherein the different sensory stimuli are based on receipt of different signals from a remote transmitting device, and wherein at least one of the sensory stimuli is an auditory stimulus.

According to a fourth embodiment, the present invention provides a mobile communication device comprising: (a) a fashion accessory; and (b) a signaling assembly, wherein the signaling assembly is housed within or affixed to the fashion accessory, is capable of generating a sensory stimulus or a plurality of different sensory stimuli and comprises at least one or at least two magnets and a contact that is capable of conducting electricity. The magnet or magnets may be used in combination with a complementary magnet or set of magnets on a charging station to create and attractive force. The use of magnets and/or contacts is advantageous when one wants to be able to dock the mobile communication device and/or charge it. However, it is also within the scope of the present invention for some devices not to be rechargeable, in which case there may be no need for magnets or other structures for attraction to a docking station. Furthermore, in other embodiments, there are no contacts, and the device is rechargeable through, for example, inductive charging, motion, heat or nuclear energy.

According to a fifth embodiment, the present invention provides a method for providing notification of a communication, the method comprising: (a) receiving a wireless communication on a mobile communication device of the present invention, wherein the wireless communication comprises information that corresponds to a sensory stimulus to generate; (b) analyzing the wireless communication within the signaling assembly, wherein the analyzing comprises determining which of a plurality of sensory stimuli to generate; and (c) generating a sensory stimulus. The information that corresponds to the sensory stimulus to generate may be determined based on a parameter of a message or notification as received on a telecommunication device. By way of non-limiting examples, the parameter may correspond to the modality of the message or notification or it may correspond to the identity of the source of the message or notification or it may correspond to the content of the message or notification or it may correspond to the urgency of the message or notification or it may correspond to the time of the message or notification or it may correspond to the location from which the message or notification was sent to the telecommunication device. When more than one parameter is considered, each may be a first parameter, a second parameter, a third parameter, a fourth parameter etc. The sensory stimulus or stimuli that are generated may depend on one, two or more of these parameters.

According to a sixth embodiment, the present invention provides a system comprising: (a) a fashion accessory; (b) a signaling assembly, wherein the signaling assembly is housed within or is affixed to the fashion accessory, is capable of generating a plurality of different sensory stimuli, wherein the different sensory stimuli are determined based on receipt of different communications from a remote transmitting device; and (c) a charging station, wherein the signaling assembly comprises a battery, at least one magnet and at least one contact and the charging station comprises at least one magnet and at least one pin. In some embodiments, the system further comprises a remote transmitting device capable of transmitting communications to the mobile communication device.

In various embodiments, the signaling assemblies of the mobile communication devices comprise a computing device, e.g., a printed circuit board ("PCB") and a microcontroller. The computing devices may be in communication with other components that are capable of providing one or more sensory stimuli, e.g., visual, auditory and tactile stimuli. Additionally, in some embodiments, the computing device may be configured to gather local external information from e.g., the user of the mobile device and/or his or her local environment and/or local broadcasters of information, e.g., vendors. Furthermore, the signaling assembly may be designed to communicate back to a telecommunications device from which it received instructions to generate a stimulus or to other devices, e.g., sending information or instructions for actions to one or more of those devices, and/or to communicate with third party devices, e.g., devices operated by vendor through for example, near field communications. By way of an example, the signaling assembly may comprise a printed circuit board, one or more software modules, a microcontroller, a device that provides haptic feedback such as a vibration motor, piezo or electromechanical polymer, a battery, one or more LEDs, and optionally, capacitors, resistors, timing devices, baluns, a microphone, LCD, an accelerometer and one or more speakers and input devices as described below.

The systems, methods, and devices disclosed herein may improve users' experiences with their telecommunications devices, such as telephones by improving users' abilities to receive information from and in some cases transmit information to their telecommunication devices without being in the vicinity of those telecommunication devices. Various embodiments of the present invention may also offer ease and convenience to users when interacting with their telecommunications devices. Thus, a user may pair one or more pieces of jewelry with another device such as a smartphone in a manner such that the wearer of the jewelry is notified of incoming messages or calls through, e.g., vibration patterns and/or subtle lights. Therefore, through various embodiments of the present invention, a user can keep his or her mobile phone out of sight but still be alerted if there is a communication of which the user should be aware, including but not limited to, one or more of phone calls, text messages, emails, calendars, social media updates and the occurrence of a lost or stolen phone.

These and other systems, methods, objects, features, and advantages of the present invention will be apparent to those skilled in the art from the following detailed description of the embodiments and the drawings.

BRIEF DESCRIPTION OF THE DRAWINGS

The systems, methods, and devices disclosed and the following detailed description of certain embodiments thereof may be understood by reference to the following figures. Elements in the figures are presented for illustrative purposes, and they are not necessarily drawn to scale.

FIGS. 4A and 4B depict a printed circuit board of an embodiment of the present invention.

DETAILED DESCRIPTION

Figure 1:
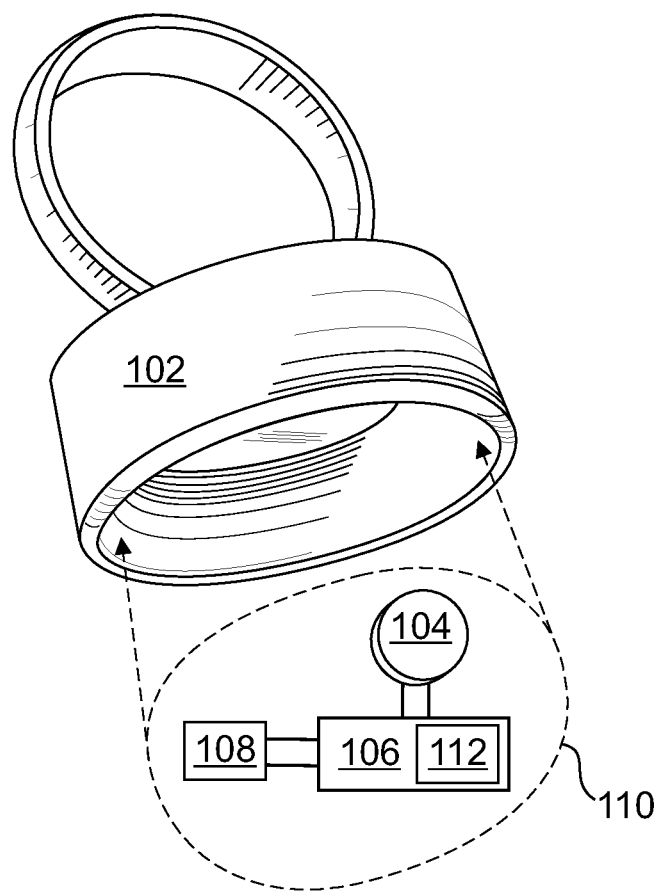
FIG. 1 depicts components of an embodiment of the present invention.
Figure 2D:
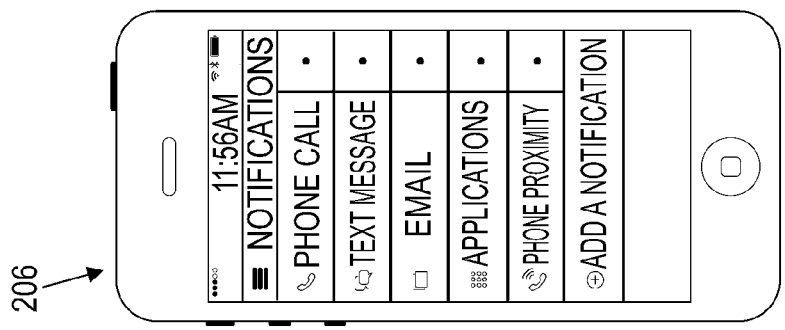
FIG. 2 depicts a telecommunications device configured to interface with a mobile communication device of the present invention.
Figure 2C:
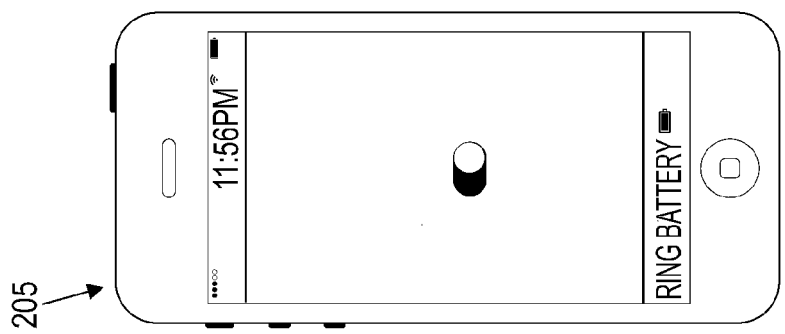
Figure 2B:
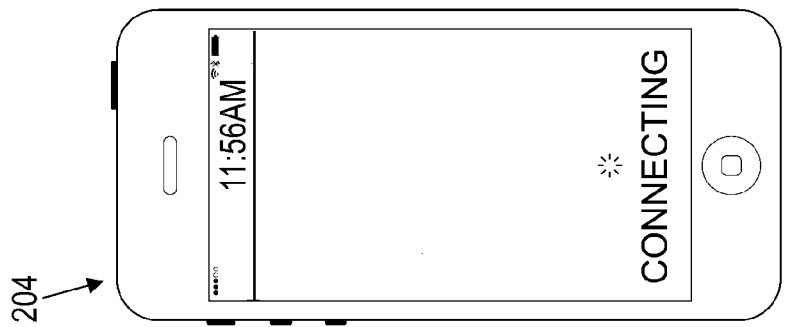
Figure 2A:
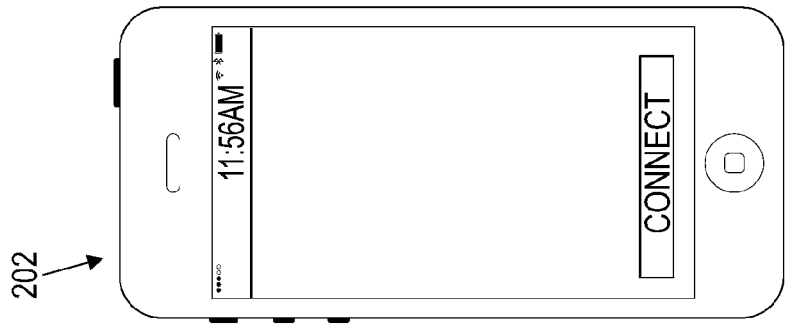

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art.

Mobile Communication Devices

According to a first embodiment, the present invention is directed to a mobile communication device. The device may comprise, consist essentially of or consist of a fashion accessory and a signaling assembly, which is the hardware that allows the mobile communication device to receive communications and to generate stimuli in response to those communications. Preferably, the mobile communication device is configured to be portable, i.e., is light enough to be carried, and optionally, contains one or more ornamental designs or aesthetically pleasing features or design elements. The fashion accessory and the signaling assembly may be associated with each other by, for example, glue or solder. In some embodiments, the fashion accessory completely encases the signaling assembly, whereas in other embodiments, the fashion accessory only partially encases the signaling assembly, e.g., encases at least 50%, at least 60%, at least 70%, at least 80%, at least 90% or at least 95% of the signaling assembly. When the fashion accessory partially encases the signaling assembly, preferably the signaling assembly is at least mostly, if not completely, obscured from view when the mobile communication device is worn by a user or adorns a user's clothing.

In various embodiments in which the device is not worn by a person, but instead is associated with another item, the device may be associated with the constructs, e.g., clothing such as a tie, vest, sweater, jacket or hat, by one or more of various methods known in the art, including, but not limited to, taping, gluing, mounting, pinning, enclosing, encapsulating or any other method of integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, cords, and other items where it may be desirable to enjoy the capabilities of the systems, methods, and devices disclosed herein.

Fashion Accessories

The mobile communication devices comprise fashion accessories and thus may be worn by a person or used to adorn a person's clothing. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. The mobile communication device may also be in the form of other items. For example, the mobile communication device may also be incorporated into pockets, steering wheels, keyboards, pens, and bicycle handles, along with other areas where it may be desirable to enjoy the capabilities of the systems, methods, and devices disclosed herein.

In one embodiment, the fashion accessory is a ring. The ring may comprise, consist essentially of or consist of a shank, which is the location that provides an opening for a finger, and a head, which comprises, consists essentially or consists of ornamental features of the ring and in some embodiments houses the signaling assembly of the present device.

The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape.

In some embodiments, the head comprises an upper face that contains and is configured to show one or more jewels and/or ornamental designs. In some of these embodiments, visual stimuli are perceivable through lights in the upper face or around its perimeter. By one non-limiting example, the lights are oriented in a design or are incorporated into the aesthetics of the upper face (and/or other portions) of the fashion element. Thus, if the fashion element is in the form of a human or animal face, head or skull, lights may be situated in the locations of the eyes. In one embodiment, there are LEDs that are designed to look like diamonds in the eyes of the face, head or skull upon receipt of an alert. Alternatively, the upper face of the ring may have an absence of any elements through which to present visual stimuli in response to communications.

By way of another non-limiting example, the head is a truncated pyramid with its larger portion being proximate to the upper face of the head. In certain embodiments, on each of one, two, three or four sides there are one, two, three, four, five, six, seven or eight LEDs lights. By using a truncated polygon and placing the LEDs only on the side(s) of the truncated polygons, when a visual stimulus is generated, it may be less distracting than were it placed on the upper face. Thus, by way of example, there may be 0-4 or 1-4 LED lights on each of the sides of a truncated polygon. In some embodiments, the angles of the truncated polygon between the sides and the base of the truncated polygon, which may be adjacent to or distal from the shank, are between 30 degrees and 75 degrees or between 40 degree and 60 degrees or between 45 and 90 degrees.

Examples of ring shank sizes are those of standard rings that are currently worn by people, e.g., US sizes 5-15, which include size 6 (approximately 16.51 mm inner diameter); US size 7 (approximately 17.32 mm inner diameter) and US size 8 (approximately 18.14 mm inner diameter). An example of the dimensions of a ring, including the shank and head is up to 20 mm by 20 mm by 30 mm or up to 40 mm by 40 mm by 40 mm or up to 50 mm by 50 mm by 50 mm.

Materials of which the jewelry may be made include, but are not limited to, gold, platinum, silver, gold micron plated brass, bronze, copper, nickel, plastic, glass and combinations thereof. Stones that may be included in the jewelry head for display include, but are not limited to semi-precious stones such as black onyx, amethyst, labradorite, malachite, garnet, citrine, opal, lapis, tiger's eye, jasper, carnelian, aquamarine, moonstone, jade, peridot, sodalite, topaz, and turquoise of for example, 10 mm by 10 mm to 20 mm by 30 mm across the largest dimensions.

In an additional non-limiting example, the piece of jewelry is a necklace and the vibration motor is located on the back of the necklace or a pendant or charm associated therewith. There may also be one or more LEDs located on the front of the necklace or pendant or charm so that the user may see a light and feel a vibration when generated.

In still another non-limiting example, the piece of jewelry is a bracelet. Here, the signaling assembly may, for example, by located within a gemstone.

Signaling Assemblies

As noted above, the signaling assembly of a mobile communication device may be housed partially or completely within the fashion accessory and is configured to generate one or more sensory stimuli of one or more different types. Sensory stimuli are of different types if they are detectable by different senses and thus are emitting through different modalities, or are detectable by the same sense and may be emitting through the same modality, but have different patterns, intervals, volumes, colors or configurations or can otherwise be differentiated by a user. The signaling assembly may comprise hardware, software or a combination thereof. Thus, in some embodiments the signaling assembly comprises one or more if not all of a central processing unit ("CPU"), which may be in the form of a microcontroller, a printed circuit board, a battery and one or more stimulus generating output devices. Examples of stimuli generating output devices include but are not limited to light emitting devices, sound emitting devices and generators of tactile stimuli, each of which is a different modality. Various components of the signaling assemblies are described in more detail below.

In some embodiments, the signaling assembly comprises a flexible circuit board with its components, a battery, a motor, an LED and a microcontroller. In one embodiment, the components are housed in a plastic subassembly such as a polyether ether ketone ("PEEK"), which is an example of an organic thermoplastic and held together by a sheet metal stamped top part. Optionally, the circuit board is coated for water-resistance with Parylene C or Parylene N polymers that can be vapor deposited to provide a thin waterproof coating between 0.1 microns and 2 mm. Alternatively, one may use an epoxy or a resin such as hot glue, and fill a cavity with a non-conductive polymer that sets in place, thereby providing waterproofing, as well as sealing and fixing. In another example, components are created with a sheet metal stamped part.

When assembling the components, one may begin by printing and assembling the PCB according to technologies that are well-known to persons of ordinary skill in the art.

Next, one may engage a PEEK subassembly injection molding and stamp a sheet metal holder. Then, one conformally coats the PCB, places the coated PCB into the PEEK assembly and attaches pins. With the PCB in place, one attaches a microcontroller, a battery and one or more stimulus generating devices to the PCB and secures a top metal sheet. Next, the signaling assembly can be placed in or associated with the fashion accessory and optionally treated for water-resistance. Finally, any stones or other ornamental designs may be added, for example, to cover the signaling assembly.

In some embodiments, a signaling assembly comprises one, two or three stimulus generating devices. When there is only one stimulus generating device, preferably, it is capable of generating a plurality of distinct stimuli that a user can differentiate. When there is a plurality of different stimuli generating devices, in some embodiments, one or each is capable of generating a plurality of distinct stimuli that a user can differentiate.

In some embodiments, each signaling assembly comprises one or more magnets and a contact. The one or more magnets may be used to orient the device when being charged. The contact(s) may be the site through which the device is charged. In some embodiments, the contact comprises, consists essentially of or consists of spring loaded pins on flat or shaped targets, or specially shaped contacts that fit together, or flat targets that engage with each other, or can be embodied in any type of shape (spherical, at an angle, or without a geometric property) provided that the parts engage with each other and provide an electrical connection. In some embodiments, the contact or contacts are used only to transfer electricity. In other embodiments, the contacts are configured to transfer data to and from the mobile communication device.

By way of a non-limiting example, the stimulus that a signaling assembly generates is determined based on the type of signal that is received by a telecommunications device. The telecommunications device may receive hundreds or thousands of messages. A user or third party software may instruct the telecommunications device to group these message into classes, wherein within each class, all message are associated with the same stimulus. The rules for creating classes may be based on the type of message, for example, one type of stimulus may be generated to alert of an e-mail having been received, another type of stimulus may be generated to alert of a voicemail having been received, and another type of stimulus may be generated to alert of a text message having been received. In some embodiments, when the stimuli correspond to different alerts of different classes of communications, the types of stimuli may vary by sense by which they are perceived, i.e., tactile vs. auditory vs. visual or be perceived by the same sensory organ of a person, yet vary in intensity, frequency, color, pattern or other parameter.

At a user's preference, classes may be more narrowly defined. In some embodiments, all communications from a remote transmitting device that originate from the same modality, e.g., voicemail vs. e-mail vs. text vs. social networking alert leads to generation of the same stimulus modality, but the stimulus itself will vary with respect to e.g., duration, color, intensity, volume, or other parameter, based on the source of the communication, and/or proximity of the sender and/or type of device that is the remote transmitting device. Thus, the classes may be defined by one or a plurality of variables, such as two or more of modality of original communication (email vs. voicemail vs. text vs. social networking alert), physical proximity of sender, time of day, duration of message and urgency of alert as determined by the sender or by a message parsing program.

In another embodiment, there is no relationship between modality of original communication and stimulus type. In these cases a user may define each class to contain one or more alert type, based on any criteria that the user selects, e.g., one or more of identity of sender, relationship of sender to user, physical proximity of sender, time of day, duration of message and urgency of alert as determined by the sender or a message parsing program, notification of any social medium update, notification of an update through a specific social medium, an alert of a sale at a vendor within a predefined proximity of a user or for a vendor in whose store the user is located, or the reaching a specific goal as determined by information received and analyzed on the mobile communication device, the telecommunication device or elsewhere.

The signaling apparatus may be configured such that it is capable of producing only one modality of stimulus, e.g., visual, auditory, or tactile. Alternatively, it may be configured such that it is capable of producing only two modalities of stimuli, e.g., visual and auditory; visual and tactile; or tactile and auditory. In another embodiment, it may be configured such that it is capable of producing three modalities of stimuli, e.g., visual, auditory and tactile.

When a mobile communication device is capable of producing more than one modality of stimulus, the mobile communication device may be designed such that it is capable of displaying the different modalities individually in response to instructions to provide users with different alerts, or in combination either simultaneously or sequentially. Thus, by way of a non-limiting example, the device may be configured to supply both tactile and visual stimuli to a user. In one embodiment, an alert of one communication or class of communications or a plurality of communications or classes of communications is provided exclusively by a visual stimulus and an alert of a different communication or class of communications or a plurality of communications or classes of communications is provided exclusively by a tactile stimulus. For example, an alert as to an email (any email, email from a specified set of persons, email from persons within a specific range, or email from a specific person) is through a tactile stimulus and an alert to a voicemail (any voicemail, voicemail from a specified set of persons, voicemail from persons within a specific range, or voicemail from a specific person) is through a visual stimulus.

In a different embodiment, one of the modalities may be used to provide information about a genus of communications and the other modality may be used to provide information about a species of communications. For example, different tactile sensations may alert a user that an email as opposed to a text as opposed to a voicemail as opposed to an update of a social networking site has been received. Simultaneously or subsequently, e.g., 0.5-10 seconds later or 1-5 seconds later, a visual stimulus may be displayed. The specific visual stimulus may vary by color, duration, number of times that a flash has been made, or other parameter, and each visual stimulus indicates from whom the specific message was sent, for example a specific individual or groups of individuals. In some embodiments, through the user's telecommunication device, he or she can designate which types of alerts are associated with which modality and/or persons or groups of persons. By having a delay, the tactile stimulus can alert the user that a visual stimulus is coming and that he or she should look toward the device.

In embodiments in which there is a combination of visual and tactile stimuli, there may also be a feature that allows the user to turn off the visual stimuli but permit the tactile stimuli to come through. This feature may be activated through an app on the telecommunication device or through the mobile device itself through for example, gesture recognition. This feature is described in terms of the visual stimuli, but it can be present with respect to any modality of stimuli.

Additionally, persons of ordinary skill in the art will recognize that the mobile communication devices of the present invention may additionally or alternatively be used to provide alerts or reminders. For example, the mobile communication device can be used to provide a reminder or alarm/alert for several things, including: waking from sleep, remembering a periodic event (e.g., to get up and walk around if you've been sedentary for a while), to take medication, to perform a task, etc. In order for the mobile communication device generate the alerting stimulus, one may program his or her telecommunication device to generate the communication to send to the mobile communication device, or one may, through the telecommunication device program the mobile communication device to store and to call up instructions for providing alerts or reminders.

Batteries

In various embodiments, the signaling assembly comprises a battery, e.g., a 12 mAh battery. Other commercially available batteries that fit within the device may also be used. The battery may be rechargeable or a single use battery. When rechargeable, the battery may be recharged either by removing the battery and recharging it or recharging it while in the mobile communication device. For example, the terminals of the battery may be connected directly to an external charger (and thus, a power supply) or to a USB host such as a computer or laptop. Examples of battery types include, but are not limited to, lithium cell, silver oxide and alkaline cell batteries.

In order to conserve energy, the device may have a default sleep mode. When there is a sleep mode, at regular or irregular intervals as activated by for example gestures of the user, the device may wake up to exchange data with a telecommunication device. A schedule for exchanging data may be controlled by a microcontroller within the mobile communication device. As persons of ordinary skill in the art will recognize, in some embodiments, the alerts are receives after the telecommunication device received and processes a message.

The systems of the present invention may be designed such that the telecommunication device sends alerts every 20 milliseconds to every minute or ever ¼ second to every 30 seconds or every 1 second to every 10 seconds, provided that there is at least one message of which to alert the user. Furthermore, if the mobile communication device and the telecommunication device are outside of the range for which they can transmit or receive information to or from each other, the telecommunication device will store the alerts and then transmit them when the mobile communication device is back within range. In order for the telecommunication device to know when it is within range of the mobile communication device, it may send and wait for confirmation of receipt signals that correspond to alerts. The mobile communication device may also be able to generate and transmit these types of signals and if it does so at regular intervals, it may be able to monitor when the mobile communication device has moved to far from the telecommunication device. If, for example, the mobile communication device looks for the telecommunication device but cannot find it, it may generate an alert that notifies the user of the inability to communicate with the telecommunication device.

In some embodiments, the mobile communication device draws less than 0.1 mA or less than 0.01 mA at least 90%, at least 95% or at least 98% or at least 98.8% of the time.

Printed Circuit Boards

The activity causing the generation of stimuli may be controlled by a microcontroller through a printed circuit board. The PCB may be configured to be consistent with an internal structure of the fashion accessory and affixed thereto. In some embodiments, the printed circuit board may be configured to cause at least two different stimuli to be generated by the same stimulus generating device (e.g., two vibrations at different intensities are different stimuli) or by two or more different stimulus generating devices (a vibration is different from a visual display). Stimuli are considered to be different if a user can discriminate between or among them. These stimuli may vary depending on the signal received from a telecommunication device such as a smartphone.

In some embodiments, the printed circuit board contains an odd number of conductive layers, e.g., 3, 5, 7 or 9, and the PCB may be a flexible printed circuit board. In some embodiments, there is a center conductive layer that lies along or near to the neutral axis of any bends, reducing or eliminating any stress or strain placed on the layer, and providing more control in the shape and characteristics of the conductive traces when flexed or bent. The printed circuit board may house its components on both sides of the board or only on one of its sides. In some embodiments, it may be desirable to distort the antenna trace within the PCB minimally.

Visual Stimuli

In some embodiments, the device is capable of generating a stimulus or a plurality of stimuli that form a visual display or a plurality of visual displays. In order to create a visual display, the signaling assembly may comprise at least one visual output stimulus device, such as a light emitting device. In some embodiments, the signaling assembly is capable of generating a plurality of different light stimuli from the same light emitting device or there is a plurality of visual output stimulus devices. For example, the light stimuli may vary based on color and/or frequency of pulsations and/or duration of pulsations and/or patterns of lights.

The light emitting device(s) may rely on one of a variety of different lighting technologies known in the art including, but not limited to, LEDs ("light emitting diodes") such as semiconductor light-emitting diodes, organic light-emitting diodes, and polymer light-emitting diodes. In various embodiments, a light source can be lit by changing pulse width modulation of the voltage placed across the leads of the PCB. In a non-limiting example, a semiconductor LED may be mounted within a device and contain red, green, and blue LEDs.

In some embodiments, pulse width modulation turns on and off the voltage at various frequencies, which modulates the brightness of an LED or a plurality of LEDs. This causes the LEDs to light at different brightness, thus allowing one of millions of colors that may be displayed. There may also be several LEDs dispersed, regularly or irregularly, around the face and/or sides of a device to establish more signals. In various embodiments, the different lighting of the LEDs may signal the type of communication that a user has received, including, but not limited to, e-mail, SMS, application notifications, notifications from social networking websites (e.g., twitter, Facebook, Instagram, Snapchat) or voicemail. Thus, the light source may function as a sensory signal indicator, and be programmed to attach any color in the available spectrum to signal receipt of a genus of communications or a specific communication and the identity of an individual or application attempting to communicate with the user. In various embodiments, the intensity of the light, the color of the light, the frequency to which the light is emitted may all be combined in patterns in order to identify content of or various details about the communication received by the user's telecommunication device.

In some embodiments, the mobile communication device is capable of generating a visual display that is a first sensory stimulus and a vibratory sensation that is a second sensory stimulus. In other embodiments, the visual display is a first sensory stimulus that displays a light pattern of a first color and the device is capable of generating a second sensory stimulus, wherein the second sensory stimulus displays the same or different light pattern in a second color. In still other embodiments, the device is configured to display two different visual stimuli that a user can differentiate based on the intensity (brightness) of displays. Thus, there may be a first sensory stimulus that displays a light pattern at a first intensity of signals and a second sensory stimulus, wherein the second sensory stimulus displays a light pattern at a second intensity. Although this paragraph describes the display of two different stimuli, in some embodiments, the mobile communication device is capable of displaying at least 5, at least 10, at least 50, at least 100, at least 500 or at least 1000 different visual stimuli amongst which a user can discriminate.

In addition to sending alerts of communications received by the telecommunication device, the visual displays can correspond to other types of information. In a non-limiting example, a weather application sends an alert to a mobile communication device that causes the mobile communication device to flash green three times before revealing a change in weather and/or flash red when there is rain in the user's area. In an additional non-limiting example, a fitness application may flash red five times to alert a user that his or her rest period is over. The application may then flash the same red color more frequently and at greater intensity if the user is overexerting himself or herself. In another non-limiting example, a location-based application flashes green multiple times when a user is in the vicinity of friends or if a store in the area is having a sale. In various other embodiments, merchants may use the invention to signify discounts or "secret" sales to their most loyal customers by transmitting different codes to users. These examples are non-limiting illustrations of the many advantages of having a light source on the mobile communication device may present.

When a vendor or third party wishes to alert a wearer of a device of the present invention, one of two processes can occur. In some embodiments, the user has previously requested that a vendor alert it to sales. The vendor would send an alert to the user's telecommunication device, which would send the alert to the mobile communication device. In order embodiments, the user will have given the vendor authorization to transmit alerts directly to the mobile communication device. In these embodiments, the vendor would, for limited purposes, become a user of telecommunications device. The user may, for example, authorize the vendor to send alerts for a limited time period or only when the user is in a limited geographic area such as the vendor's physical store.

The visual stimuli can also be used to send coded messages. For example by using or combining colors, durations of displays and/or order of visual signals, coded message could be sent to users. When working with coded messages, a third party can send a communication that is itself a code to be displayed or the third party can send a message in a standard language, and an application on the telecommunication device or used in conjunction with the telecommunication device can encode the message into a format with which the user is familiar. The use of codes is not limited to visual stimuli, and it may be used in conjunction with or alternatively by other stimuli, including but not limited to auditory and tactile stimuli.

In some embodiments, there is a feature for turning off of one or more of the stimuli. For example, this feature may allow the user to cause the mobile communication device not generate stimuli of a particular modality. This feature may be activated on the mobile communication device level through for example, recognition of certain gestures or through the use of an app on the telecommunication device level. In practice, the systems can be configured such that this feature either causes the telecommunication device not to send the signals that correspond to the alert, or to allow the message to be sent, but to have it not be displayed by the mobile communication device. In some embodiments, messages that are not displayed during a specified period are never displayed. In other embodiments, they are displayed after the expiration of that period. In still other embodiments, they are converted either at the telecommunication device or on the mobile communication device into a different stimulus, e.g., vibratory.

When a combination of stimuli of different modalities is to be generated in response to the same communication received by the telecommunication device, a user may be able to turn off one or both of those modalities. By way of example, if a vibration indicates that a genus of communications were received and an LED indicates a species of from whom a particular communication was received (e.g., individual or group or individuals), the user may be able to turn off the LED indicators but still receive the vibrations that are indicative of the genus.

Auditory Stimuli

When the stimulus output producing device is configured to generate sound, preferably the device comprises a speaker and optionally a sound synthesizer or other device for generating one or more audible stimuli as directed by the microcontroller. When the device is capable of generating a plurality of audible stimuli, in some embodiments, the plurality of stimuli vary based on one or more if not all of frequency of sounds, rhythm, melody or volume or other parameter. In some embodiments, one use piezo speakers to project the sound. Additionally or alternatively, when the mobile communication device is configured to provide auditory stimuli, it is capable of producing or more if not all of beeps, buzzes, chimes, music electronic noises and recordings or synthesized natural sounds such as bird calls or whale calls.

Tactile Stimuli

When the stimulus output producing device is configured to generate a tactile sensation, preferably the device comprises a motor, e.g., a vibration motor such as a pancake vibration motor or linear actuator or off-center motor. The motor may, for example, be configured to generate a single type of vibration or pulsation or to generate a plurality of types of vibrations and/or pulsations that vary based on pattern and/or intensity or other parameter. Other types of tactile stimulation that the signaling assembly may be configured to generate include, but are not limited to, pressure by causing a blunt or other element to extend through the housing when activated. Still other examples, include but are not limited to the pulsing of a ring or bracelet, and the constriction and loosening of a ring or bracelet in a small but perceptible manner.

The motor may be, though is not required to be, mounted on a PCB. In various embodiments, the vibration motor may vibrate when a voltage is placed across the terminals of the PCB. Additionally, the strength of the vibration may be adjusted accordingly with the modulation of the voltage provided across the PCB (through e.g., firmware). In various embodiments, the vibration motor's vibrations vary in strength, duration, or quantity of distinct durations (pulses). These variations can vary depending on different types of notifications, or specific people or applications or input received on the device, e.g., through gestures, or other feedback on the device to convey information.

Input Devices

Optionally, the mobile communication device may also comprise one or more input devices. Input devices are devices that allow for information to be communicated to or detected by the device locally, and include but are not limited to manual switches, buttons, touchscreens, cameras, accelerometers, gyroscopes, pulse monitors and devices that measure skin conduction e.g., galvanic skin response. In some embodiments, the mobile communication devices have an absence of any manual switches or buttons. Thus, for example, in some embodiments, the device does not contain an acknowledge button by which to cause the device not to display alerts of communications. In other embodiments, this feature is present or acknowledgment can be detected through gesture recognition.

In various embodiments, the systems, methods, and devices disclosed herein may notify a user of his or her physical surroundings, e.g., physical location as determined by a GPS protocol through the use of a GPS tracking unit and software located on the mobile communication device or on a device or network coupled to the mobile communication device.

In various embodiments, the systems, methods, and devices disclosed herein may wirelessly connect to devices in a user's home, such as smoke alarms, animal collars, security systems, home appliances, computer peripherals, or other such home devices in order to receive alerts of changes or to allow a user to communicate with his or her environment remotely. The devices may serve as remote input devices that are part of a system for communication of the present invention, but are not housed within the mobile communication devices of the present invention. These devices may communicate directly to the mobile communication device or to the user's telecommunication device, which would send instructions for an alert to be generated by the mobile communication device. Additionally, in various embodiments, the systems, methods, and devices disclosed herein may include special emergency communications capabilities that directly contact proper emergency and help individuals in case of an accident. For example, an accelerometer may detect information that indicates whether a user has fallen.

In one example, the printed circuit board contains a 2-axis or a 3-axis or a 6-axis accelerometer so that a user can tap either the device itself or the device onto a surface or make a gesture, to communicate back to the telecommunication device or other device. Thus, a user may use a series of taps to check if his/her device is still connected. In another non-limiting example, a user may use a different series of taps in order to respond to a communication with a message that the user is currently busy. Still further, a user can move his/her mobile communication device in a circle in order to turn off the lights on the device. In another non-limiting example, a user can shake to turn the mobile communication device off or make a gesture that the device is configured to recognize. The user can also use other methods known in the art to track the user's activity and movement.

In various embodiments, the mobile communication device may have the ability to interact with other similar mobile communication devices. For example, the devices may use near field communications technologies to establish a communication session with each other or any other near field communications enabled device, including, but not limited to, a mobile phone and/or smartphone, NFC enabled stickers or tags, and bus or transit terminals. When using NFC technology, one may use an antenna, a small chip and a PCB.

In various other embodiments, the device's various input and sensory detection capabilities may be combined in order to accomplish different tasks. In a non-limiting example, when two users each have mobile communication devices of the present invention and those users shake each other's hands a near field communications enabled device on each mobile communication device may automatically add each user to the other's contact list. Alternatively, one may use Bluetooth technology or other ratio communications technology for this feature.

In another non-limiting example, users who wear the mobile communication devices as rings may give another user a "hi-five," which is detected by a combination of speed (such as, but not limited to, use of an accelerometer) and contact (via, but not limited to, a near field communications chip or device), subsequently, the users may be added to each other's social networks. The features may be carried by technologies such as accelerometers, near field communication and optionally proximity detection technologies. In some embodiments, the information is transferred to the telecommunications device, which contains an app that directs performance of the action through, for example, communication to a third party API.

Information received from an input device may be transmitted to other devices via the same antenna, described below, through which the communications are received. By way of a non-limiting example, to facilitate receipt and transmittal of information, a radio frequency ("RF") transmitter may be part of or annexed to a jewel in a fashion accessory. In some embodiments the jewel is radio transparent or radio translucent.

Microcontroller

In various embodiments, the mobile communication device may comprise a microcontroller. The microcontroller, which also may be referred to as a microprocessor, processes the wireless communications that are received through, for example, an antenna and transferred through an antenna trace. Thus, the microcontroller interfaces with the circuitry of the printed circuit board and directs activity, such as the generation of stimuli. In some embodiments, the communication received by the microcontroller is the instruction of which stimulus to generate. Thus, analysis of the type of communication and the corresponding stimulus to generate may be done on the transmitting device or on a server or in the cloud and not necessarily on the mobile communication device. By having the determination of the type of signal to generate be determined by a transmitting device such as a telecommunication device or network, less powerful microcontrollers may be used, and one may save energy and/or space.

Additionally, in some embodiments, the communications to the mobile communication device are pings that are used to ensure that the device is in range. Additionally or alternatively, in some embodiments, the mobile communication device acts more like a relay, transmitting data from the phone back to the phone for further analysis. In all of these embodiments, transmission from and receipt of information by the mobile communication device may be controlled through the microcontroller.

When the microcontroller receives a communication, the microcontroller may pursuant to the information received in the communication produce a stimulus such as a vibration by changing the voltage and thereby causing a tactile stimulus to be generated. In various embodiments, the microcontroller may cause a light source to emit light by placing changing voltage across the light source's positive and negative (ground) terminals. In order to control the parameters of the microcontroller's logic, software may be used to implement directions, including, but not limited to, changing or implementing different sensory signal indicators. This software may be upgraded via a number of data transmission techniques known to the art, including, but not limited to, USB, FireWire, Bluetooth (e.g., Bluetooth Low Energy BT 4.0), and WiFi. The software may also be upgraded to add new features or correct flaws. The software may be stored on the mobile communication device in persistent memory and be accessible for use in response to communications that the device receives. In some embodiments, the memory is capable of holding from 2 kilobytes to 10 megabytes or larger, e.g., up to 128 gigabytes or several hundred gigabytes.

Instructions for carrying out the various processes of the present invention may be stored in a computer program product within or coupled to the signaling assembly and organized in one or more modules. A set of modules may, for example, comprise a module for receiving information sent from a telecommunication source, a module for analyzing the received information, a module for generating a stimulus, a module for receiving locally generated or collected information and a module for transmitting locally generated or collected information to a remote location such as a telecommunication device. Each module is coupled to other modules as needed to execute the various embodiments of the present invention.

The devices of the present invention may receive communications, directions, or notifications from one of various communications devices known to the art, including, but not limited to, telephones, mobile phones and/or smartphones, laptops, tablets and other communication devices (collectively "remote transmitting devices" or "telecommunication devices") as described below. Receipt of communication may, for example, be through an antenna as described below.

Still further, the signaling assembly may comprise a transmission element that allows for the creation and transmission of locally collected or generated information to a remote device such as the user's telephone, e.g., mobile phone such as a smartphone, or to another telecommunication device or home computer, laptop, tablet, networked computer, iBeacon or in the cloud. When there is a transmitting feature, collection and transmission of this information, may, for example, be controlled by the microcontroller.

In various embodiments, the signaling assembly is in the form of a semiconductor package that includes both the microcontroller and printed circuit board that is imbedded in the mobile communication device. The use of a semiconductor package reduces the overall footprint because of the elimination of redundant electrical connections.

Additionally, in various embodiments, the mobile communication device comprises one more input devices as described below. The microprocessor may be designed to receive data from these devices and either to analysis the information and to generate stimuli based on the analysis or to transmit the information to a remote device for processes.

Antennae

Each device of the present invention may also comprise an antenna or a plurality of antennae. An antenna is employed to improve the ability of devices to receive and to transmit radio waves or other electromagnetic waves. In some embodiments, the antenna is an external component or material that receives the electromagnetic waves and allows the signal to be sent elsewhere on the device for processing. The antenna may be designed using certain materials and shapes to provide characteristics to improve the performance of the reception and transmission, and the path from the antenna to the signal processor, which may be referred to as the antenna trace. In some embodiments, the antenna is partially or completely housed within a mobile communication device and may be configured to receive and optionally to transmit communications to a telecommunication device through, e.g., Bluetooth communications.

In some embodiments, no portion of the antenna is visible when the device is worn, e.g., it may be completely encased or may be located on a side that is hidden partially or completely from view by third parties, e.g., the back of a pendant.

An antenna or a plurality of antennae may be associated with e.g., a Bluetooth module and configured to send and receive radio signals, so that all telecommunication devices that use Bluetooth v4.0 would support communication with the mobile communication device, provided that they are paired with the mobile communication device.

An antenna's performance can be affected by materials surrounding the antenna and the antenna trace. To optimize the use of the antenna, it is often desirable to control the surrounding material, or to place the antenna in a location where the surrounding material is controlled or there is no surrounding material for at least a portion of the antenna.

In one embodiment, the antenna is placed away from the microcontroller and the antenna trace, which refers to the conductive material that carries information from the antenna to the PCB and microcontroller and optionally follows a non-linear path including corners and bends, optionally across different planes. When using a flexible circuit board, the antenna trace may lie on an interior plane of the board and coincide with the neutral axis, thereby reducing or eliminating strain or stress on the antenna, which in turn allows the performance of the antenna to be minimally altered when the board flexes.

In some embodiments of the present invention the antenna is less than 2 cm in length, less than 1 cm in length, less than 5 mm in length, less than 3 mm in length or from 0.1 mm to 2 cm in length, or 1 mm to 1.5 cm in length or from 1 mm to 5 mm in length. In some embodiments, the antenna is in the form of chip that is less the 3 mm$^2$ or less than 2 mm$^2$ or less than 1 mm$^2$.

When the antenna trace is bent or curved, in some embodiments, there is at least one bend, or are at least two bends, at least three bends, or at least four bends, wherein the angle at each bend is independently between 30 degrees and 150 degrees or between 45 degrees and 135 degrees or between 60 degrees and 120 degrees or approximately 90 degrees.

In some embodiments, a portion of or the entire antenna is housed within the fashion accessory. In these embodiments, one may select the use of one or more semi-precious stones as part of the fashion accessory. One benefit of using semi-precious stones, particularly those that are known to be radio transparent is that as compared to metal components of the device, there will be less interference with or disruption of communications to and from the signaling assembly.

Thus, one may put the semi-precious stone, which is at least partially exposed and thus visible to the user, between the antenna and the exterior of the mobile communication device and have no metallic substance located between the antenna and the semi-precious stone. If the stone has an upper face that is visible to a user, it may have a lower face on the opposite side that is not visible to the user, but that is proximate to the antenna. Thus, in some embodiments, communication signals can travel from the exterior of the device through the semi-precious stone to the antenna without encountering metal. In some embodiments, the antenna or a portion thereof is perpendicular to an axis of the semi-precious stone, parallel to an axis of the semi-precious stone or at an angle relative to the semi-precious stone. From this antenna may emerge an antenna trace that connects the antenna to the microcontroller. The trace may be part of a board that wraps other components of the signaling assembly.

Persons of ordinary skill in the art will recognize that instead of or in addition to the semi-precious stone there may be a non-metallic material. Thus, in some embodiments, all or a portion of the upper surface (i.e., between at least one side of the antennae and the exterior of the mobile communication device) of the fashion accessory comprises, consists essentially of or consists of a semi-precious stone, a non-metallic material or a combination thereof.

Telecommunication Devices and Communications Therefrom

The mobile communication devices may be configured to receive communications from one or more other telecommunication devices, which may be referred to as remote transmitting devices via wireless communication networks. These devices that transmit information to the mobile communication devices of the present invention, include but are not limited to telephones, such as mobile phones, e.g., smartphones, such as Android or Apple OS, laptops, tablets, and iBeacons.

In some embodiments, the telecommunication device is a device that is paired with the mobile communication device and is capable of sending information to one or more specified mobile communication devices through, for example, Bluetooth technologies. Thus, a user may take an appropriately configured mobile communication and through an app on the telecommunication device have the telecommunication device learn the identity of the mobile communication device and configure itself to send information to and to receive information from the mobile communication device through for example, the use of a unique address.

In some embodiments, if the mobile communication device is out of range (i.e., disconnected from a telecommunication device or beyond a specific distance from the telecommunication device) the user may be alerted through vibration or light patterns. In other embodiments, the user is notified when the device is within a specific distance. This feature will indicate to the user that he/she is far away from the mobile device and may have left it behind or it was stolen. The device may also be configured to be context aware, knowing that if the user is at a specific location, the distance to which the user will be alerted changes. For example, the mobile communication device may know that the user is at work by getting the geo-coordinates from a telecommunication device or the mobile communication device itself, and set a shorter range. In some embodiments, the systems of the present invention are configured to operate when the mobile communication device is up to 200 feet away from the telecommunication device, up to 100 feet away from the telecommunication device, up to 50 feet away from the telecommunication device, or up to 250 feet away from the telecommunication communication device.

In some embodiments, the device will determine that it is out of range when it does not receive data from the phone, and may then trigger a stimulus or stimuli that notify a user that he or she is out of range. Similarly, if the mobile communication device detects that it is far away from the telecommunication device, through for example, signal strength it may trigger a stimulus or stimuli that notify the user that he or she is moving too far away from the telecommunication device.

The telecommunication devices comprise hardware and software that are configured to package and to transmit information over a wireless network to one or more designated mobile communication devices of the present invention. By way of a non-limiting example, the telecommunication device comprises a CPU, memory, cellular telephone functionality and an apparatus through which to transmit information and one or more modules for addressing and transmitting information to a mobile communication device. Information may, for example, be transmitted wirelessly directly from the remote transmitting device to the mobile communication device or through a network.

The same telecommunication devices may be configured to receive information from one or more mobile communication devices. Alternatively or additionally, the same mobile communication device may be configured to receive information from one or more telecommunication devices.

By way of a non-limiting example, the telecommunication device is a mobile phone or home or network computer that contains an app that permits communication with one or more mobile communication devices of the present invention. In various embodiments, the telecommunication device may contain a software program specifically designed to allow interaction with the mobile communication device. A user may develop, obtain for free or purchase from a developer, an application that contains this software for his or her telecommunication device. The user may then download the software and activate it. The user may use the software in order to program or alter the capabilities disclosed herein, including, but not limited to, display colors and vibration intensity for type of message and/or persons associated with those messages.

In various embodiments, a user may uniquely identify the user's particular mobile communication device in order to direct the application to communicate with and/or alter the preferences for the user's specific device. Those skilled in the art will appreciate that there are several methods known that can establish a secure, private connection between two devices and that any of those methods may be employed to identify and communicate with a user's particular mobile communication device. In a non-limiting example, a user may enter an identification code for the user's mobile communication device into an appropriate module of the software on the telecommunication device that will initiate the pairing process. The user may then activate a function in the application to begin establishing a connection between the mobile communication device of the present invention and the mobile phone and/or smartphone application, thereby pairing the mobile communication device and the telecommunication device. Alternatively, this function may be automated.

The application may use protocols such as Bluetooth (e.g., Bluetooth Low Energy) to communicate with a mobile communication device, looking for only the device with the associated user's unique code. The user may also activate a function in the application that will search for devices that are allowed to pair with the mobile device and related software. If the application finds more than one eligible device it may prompt the user to choose the device or devices that he or she wants to pair with the application. After the application locates the uniquely identified mobile communication device, the device's identity is remembered by the application and is stored in the mobile phone and/or smartphone device. This functionality may be turned off depending on if a user has multiple accessories that the user uses at the same or different times. Additionally, this functionality may be performed multiple times for a telecommunication device, if a user employs multiple mobile communication devices.

Each mobile communication device microcontroller may have software and storage so that it may remember the specific remote transmitting device with which it is paired. The mobile communication device may be unpaired through software on the telecommunication device as well, eliminating the connection between a mobile communication device and a mobile phone and/or smartphone. This process of pairing may, for example, be implemented through a single button or click option. Those skilled in the art will further appreciate that the software required to implement the systems, methods, and devise disclosed herein may vary, in order to work with different operating systems and programming languages.

In various embodiments, the mobile communication device may be in communication with the telecommunication device in order to monitor incoming communications, including, but not limited to, alerts of a telephone call. Thus, the mobile communication device may be in communication with software on the mobile phone and/or smartphone, including, but not limited to, a specially designed application, to identify incoming calls via an API exposed by the operating system. The software on the remote transmitting device may recognize the call and then identify the user's preferences for call notifications to a specific type of notification for the mobile communication device to display or employ. Thus, in some embodiments, the mobile communication device does not receive email, voicemail, text message or SMS messages. Instead, it receives information of what stimulus to generate. In a non-limiting example, if the user has programmed or activated functionality in the software to produce different types of unique notifications for different callers, the software may associate the unique notifications to a caller's contact information exposed over the API.

Although in the embodiment described above, the mobile communication device does not receive the content of the message, in other embodiments, some or all of the content of the message may be received on the mobile communication device. For example, in an iOS application, the mobile communication device may receive information that indicates that there is an alert. The telecommunication device, e.g., the smartphone, alerts the mobile communication device that there is an alert, but does not provide additional information. The mobile communication device then requests more information, such as the type of alert and/or identity of sender. The telecommunication device may then send information that for example, identifies the type of the message and the sender (e.g., an e-mail from John Smith). This information may be sent to an application on the telecommunications device. The application then tells determines what stimulus or which stimuli to generate and sends this information back to the mobile communication device, e.g., buzz twice and then flash a red light four times.

In an alternative embodiment, the telecommunication device sends the communication that it receives from for example, a third party to the mobile communication device. It also may send content, time of message, location of sender of message and urgency of message to the mobile communication device. The microcontroller on the mobile communication device executes a computer program and determines which stimulus or stimuli to generate in response to the information that it receives.

In another example, (Android, for instance) all that the device receives is the command on the stimulus or stimuli to generate. For example, the mobile communication device receives an instruction to buzz or to flash, which is determined by the telecommunication device.

Which stimulus or combination of stimuli to associate with what type of communication and from whom, may be determined by a user through software designed to permit these associations to be made. The software may be designed to allow users to select whether communications from a plurality of third-parties (e.g., contacts) and/or a plurality of types may be associated with the same stimulus alert. For example, all e-mail notifications may be associated with a vibration stimulus and all voicemail may be associated with a visual stimulus. In this embodiment, all e-mail may receive the same vibratory stimulus and all voicemail will receive the same visual stimulus. In some embodiments, the user may have the option through a menu in the software of providing unique alerts to a subset of communications, e.g., those from one or more select people. By way of a non-limiting example, a default for all e-mail may be one pulsation pattern, and e-mail from a user selected high-priority of people may receive a different pulsation pattern, e.g., longer and/or more intense. The same differentiation can be applied to visual and/or auditory stimuli. Thus, a user may identify callers in the user's contact list to the software in order to match notifications to contacts. In various embodiments, the software may need to ask a user for permission to access the contact list and provide options on how to treat communications from contacts. In still further embodiments, the system is configured to provide for stimulus differentiation based on the content of the original communication. Thus, an urgent message may be treated differently than a non-urgent one, or messages that arrive in quick succession or that have more than or fewer than a specified number of other recipients may be treated differently.

The software may communicate with the remote transmitting device's wireless communication interface and instruct the interface to send a caller's unique notification to the mobile communication device. The remote transmitting device's Bluetooth interface may convey the unique notification to the Bluetooth interface on the mobile communication device. The mobile communication device and the remote transmitting device may communicate wirelessly over the Bluetooth protocol via radio frequency transmission and reception, and thus can communicate when within a range for which Bluetooth communications are possible.

The mobile communication device may search for incoming Bluetooth communications via the integrated wireless communications interface in the mobile communication device. The software integrated into the mobile communication device may receive a transmitted unique notification and generate a stimulus or stimuli on the mobile communication device's output interface. In a non-limiting example, the generation of the stimulus may be accomplished by raising the voltage on pins connected to a vibration motor, raising the proper voltages on the LED to produce an indicated color, or a combination of the two. Those skilled in the art will recognize that the transmission of the unique notification between the telecommunication device and the mobile communication device may be accomplished using a variety of different wireless communication protocols. Those skilled in the art will also recognize that the process of communicating a notification of an alert to the mobile communication device may be used for alerts of many types of communications, including, but not limited to, text messages, picture messages, application notifications, proximity notifications and phone notifications (i.e., low battery).

By way of another non-limiting example, a device may be configured to generate a first sensory stimulus in response to an SMS message received by the remote transmitting device and to generate a second sensory stimulus in response to a voicemail received by the remote transmitting device, regardless of the original sender of the message. By way of another non-limiting example, the device may be capable of generating a first sensory stimulus in response to an SMS message received by the remote transmitting device and be capable of generating a second sensory stimulus in response to an e-mail received by the remote transmitting device. Thus, in response to the communication, the signaling assembly causes a sensory stimulus to be generated.

Above are described various embodiments in which the user pairs his or her telecommunication device with his or her mobile communication device. However, there may also be systems and devices in which the user can receive information directly from third parties on his or her mobile communication device. In these embodiments, embodiments, a user may grant access to his or her device to one or more vendors or information provides, thereby temporarily or permanently providing devices outside of a user's control, such as those under the control of a retail vendor, with the ability to communicate with the user on the user's mobile communication device. Thus, in various embodiments, the mobile communication device is configured to interact with other devices such as iBeacons.

In a non-limiting example, the mobile communication device enables users in a physical retail location, sporting event or park to save information about physical items or events and send the information to an application on his/her mobile device or smartphone. In another example the user can tap his/her mobile communication device when he/she is inside a physical retail location to signal that he/she "likes" something or that he/she is looking for a sales representative to help. By way of a non-limiting example, a NFC enabled tags on an item in a brick and mortar store would send the data from the tag, to a mobile communication device, e.g., a ring, to the telecommunication device, e.g., a smartphone. The smartphone then interfaces with the vendor of the brick and mortar store, who alerts a salesperson that the user would like assistance. The benefit of this method is that there is no need to remove one's smartphone from one's pocket or bag. For devices that do not support NFC, the mobile communication device, i.e., the ring would act as an enabling device.

Charging Stations

In various embodiments, the mobile communication devices of the present invention are configured to be recharged. Optionally, they are part of systems comprising one or more mobile communication devices and one or more charging stations, which also may be referred to as charging devices or charging apparatuses. In some of these embodiments, a mobile communication device comprises one, two or at least two magnets and one or more electrical contacts. In other embodiments, there are no magnets. The electrical contact or set of contacts on a mobile communication device is configured to allow electricity to flow from an external source to a battery within the mobile communication device and/or instructions to flow from an external source to the microcontroller within the mobile communication device. In some embodiments, the contacts indicate when the mobile communication device is within the charging apparatus.

In some embodiments, in the mobile communication device there are two magnets on one side of the mobile communication device that are oriented such that a north pole is facing outward or toward the exterior of the mobile communication device for a first magnet and a south pole is facing outward or toward the exterior of the mobile communication device for a second magnet. In other embodiments, there are two or more magnets on two or more side of the mobile communication device. A charging station may exist that has a reciprocal orientation of magnets such that when the mobile communication device approaches the charging device in the correct orientation, the magnets cause there to be an attraction, and in an improper orientation, there is repulsion. In other embodiments that use magnets, there may be a configuration for attraction between the charging device and the mobile communication device, but now configuration for repulsion. Alternatively, there may be a configuration for repulsion for when the device is in the incorrect orientation, but none for attraction when it is in the correct orientation.

Thus, in one embodiment, there is a system for charging a device comprising a mobile communication device of the present invention and a charging station that is configured to reversibly engage the mobile communication device. The charging station and the mobile communication device each comprise one or more contacts for the transfer of electricity and/or data. Additionally, in some embodiments, each of the mobile communication device and charging apparatus may comprise a magnet or a set of at least two magnets that are oriented to attract the magnet or set of magnets of the other component when the components are in a proper alignment. The charging apparatus may also contain a second set of magnets that will repel the magnets on the mobile communication device if they are in an incorrect orientation. Thus, in some embodiments, there are more magnets on the charging station than on the mobile communication device. The charging apparatus comprises or is configured to engage a power source, e.g., an electrical outlet connected to a generator or other power source and/or comprises or is configured to receive a USB cable through a USB connector, e.g., a micro A USB connection that allows for communication to a computer and/or remote transmitting device.

In another embodiment, the present invention is directed to a system for recharging a mobile communication device comprising: (a) a mobile communication device of the present invention; and (b) a charging station, wherein the signaling assembly of the mobile communication device comprises a battery, at least one magnet and an electrical contact for receiving electricity and the charging station comprises at least one magnet and a contact for the transmission of electricity.

The charging station may be designed to have aesthetic appeal. By way of a non-liming example, the charging station may be a container, e.g., in the form of a jewelry box, such as a ring box. The ring box may be used to store the ring, and it may contain the charging mechanism that optionally is located in an ornamentally desirable housing, and thus looks like a ring box.

In one embodiment, the ring has one or more contacts on the exterior of the ring that are capable of engaging with one or more contacts on the ring box. When the mobile communication device is charging, the contacts may be held in place by gravity, or by magnets or other means. The charging station may also have a receptacle that is shaped to receive the ring in such a way to aid in the placement of the ring in the charging station, for example, a cavity configured to receive a portion, e.g., at least 50%, at least 80%, at least 90%, at least 95% or the entire shank of the ring.

In some embodiments, the charging station comprises one or more charging pins to be aligned to the charging contacts on the device. When the charging device has pins, preferably the mobile communication device has appropriately placed receptacles for the pins such that when the magnets are properly aligned, so too are the pins and their receptacles.

By way of a non-limiting example, the mobile communication device may have one or more magnets, e.g., a pair of magnets on a side, e.g., the base of a component of the fashion accessory such that north pole of one magnet and south pole of another magnet are exposed or oriented toward the exterior of the device. When oriented toward the exterior of the device, preferably any material between the pole and the exterior of the device is sufficiently thin that the magnetic force of the magnet can be felt. A contact may be located on the same side of the device as the magnets, between the magnets or elsewhere on the same side or on a different side of the device. In one embodiment, the contact itself is comprised of one or more magnets and no additional magnets located within the mobile communication device.

The charging station may be configured to have one or more magnets that are arranged to exert an attractive force on the mobile connection device when a pin or pins such as pogo pins of the charging device would be aligned with the contacts of the mobile communication device. E.g., there may be a pair of magnets on the charging apparatus that are oriented with one of the two magnets exposing or orienting externally a north pole whereas the other magnet exposes or orients externally a south pole. If the charging contact is between the magnets on the mobile communication device, the pin(s) on the charging apparatus are between the magnets of that device. When the contact(s) (and their receptacles if present) and pin(s) are aligned, the magnets of the mobile communication device with the north pole that is exposed or oriented externally is aligned and in some embodiments, in contact with the magnet of the charging apparatus with the exposed south pole. Similarly, when the contact(s) (and their receptacles if present) and pin(s) are aligned, the magnets of the mobile communication device with the south pole that is exposed or oriented externally is aligned and in some embodiments, in contact with the magnet of the charging apparatus with the exposed north pole.

As noted above, in some embodiments, the charging apparatus has a receptacle for a portion or all of the mobile communication device. In order to discourage insertion of the mobile communication device in the incorrect orientation, the charging apparatus may include a second set of magnets. This second set of magnets may be oriented such that if the mobile communication device is inserted in the incorrect orientation, the north pole of this second set of magnets will be aligned with the north pole of the pair of magnets of the mobile communication device and the south pole of this second set of magnets will be aligned with the south pole of the pair of magnets of the mobile communication device thereby exerting a repulsion force. In another embodiment, in order to make use of repelling and attractive forces of magnets, each of the mobile communication device and charging apparatus may have two sets of magnets that facilitate guiding the mobile communication device into proper orientation. In still another embodiment, the mobile communication device has more magnets than the charging station. Thus, by way of further examples: there may be one magnet in the mobile communication device and one magnet in the charging station; there may be one pair of magnets in the mobile communication device and one pair of magnets in the charging station; there may be one magnet in the mobile communication device and two magnets in the charging station; there may be two magnets in the mobile communication device and one magnet in the charging station; there may be one pair of magnets in the mobile communication device and two pairs of magnets in the charging station; there may be two pairs of magnets in the mobile communication device and one pair of magnets in the charging station; and there may be two pairs of magnets in the mobile communication device and two pairs of magnets in the charging station. By changing the orientation of the poles of the magnets one can provide for attractive and/or repulsive forces to be present.

The above-description suggests that there may be a correct and incorrect orientation by which to insert the mobile communication device. However, in some embodiments, the mobile communication device can be inserted in a plurality of orientations. In these systems, there may be a single contact that is in the middle of the mobile communication device such that regardless of the orientation, the proper contact can be made with the pin or set of pins of the charging apparatus, which are located centrally in the receptacle. Alternatively, the mobile communication device may have a plurality of contacts and/or the charging apparatus may have a plurality of pins or sets of pins in order to accommodate holding the mobile communication device in different orientations.

In another example, mechanical features can be used instead of or in addition to the magnets to align the contacts. Examples of mechanical features include but are not limited to one or more of a clasp, a spring and hook assembly, friction and plug such as a USB plug and receptacle.

In some embodiments the charging device has only one station for one configuration of jewelry, e.g., for a ring of a particular size. In other embodiments, the charging device has a plurality of charging locations. Thus, there may be a first charging location on the charging device that is configured to charge a ring of a first size or configuration and a second charging location that is configured to charge a ring of a second size or configuration. Alternatively or additionally there may be one or more charging location that allow for charging of different types of jewelry such as a necklace or a bracelet in the same charging device.

In another embodiment, the charging station contains a battery (either chargeable or non-rechargeable) or is configured to hold a battery that can recharge the wearable device while not being connected to an external power source. If the battery of the charging station is rechargeable, plugging the charging station into a power supply will allow the internal battery of the charging station to be recharged, as well as the mobile communication device to be recharged. In this fashion the charging station can be charged and then used as a portable charging device.

Methods

In some embodiments, the present invention provides methods for providing notification of a communication. A method may begin with receiving a wireless communication on a mobile communication device. The wireless communication may be received through an antenna that is housed within a fashion accessory. In some embodiments, the wireless communication may convey information as to the class of communications, e.g., the genus of the communication such as a whether it corresponds to a voicemail or an e-mail, or only instructions of the type of stimulus to generate, and the mobile communication device may be configured to cause generation of different stimuli based on the class of communication. In other embodiments, the mobile communication device may be configured to receive and does receive the content of communication that was received by the telecommunication device. When the mobile communication device receives the content of the communication that was received by the telecommunication device, it may either also receive and instruction of the type of stimulus to generate or contain a computer program product that allows the mobile communication device to determine which stimulus to generate. In another embodiment, the mobile communication device receives the complete communication that originated from a third party, transmits that information to the telecommunication device from which the mobile communication device received it and receives back instructions of which stimulus or stimuli to generate.

Regardless of whether the mobile communication device receives a complete communication as originated from a third party or only instructions of which stimulus or stimuli to generate, the mobile communication device analyzes the information through its signaling assembly. The analyzing may comprise determining the stimulus or stimuli to generate by accessing a protocol that is configured to receive the communication from a remote transmitting device as input and to generate an output that varies based on the input. Next the method may comprises generating a sensory stimulus, wherein the sensory stimulus provides notification of the receipt of a communication from a specific person, from a designated group of people, from a geographic location or of a particular class of communications that is not defined by the original sender. The sensory stimulus may be different for different classes of communications or communications from different persons or parsed on the basis of urgency of the message.

By way of a non-limiting example, the class may be selected from the group consisting of a telephone call, a voicemail, an SMS message and an e-mail. In some embodiments, when the communication received by the telecommunication device is of a first class, the sensory stimulus that the mobile communication device generates is of a first type, which is a visual display and when the communication is of a second class, the sensory stimulus is of a second type, e.g., a vibration. In other embodiments, when the communication is of a first class, the sensory stimulus is of a first type that is a first visual display and when the communication is of a second class, the sensory stimulus is a second visual display, wherein the first visual display and the second visual display differ by one or more of intensity, pattern, color or frequency of pulsation. In still other embodiments, when the communication is of a first class, the sensory stimulus is of a first type that is a first vibration pattern display and when the communication is of a second class, the sensory stimulus is a second vibration pattern, wherein the first vibration pattern and the second vibration pattern are different. Any particular mobile communication device may in some embodiments be capable of generating from 2-5000, 2-2500, 10-2000, 50-500, 2 to 100 or 5-50 different sensory stimuli among which a user can discriminate.

The above described examples describe the stimuli varying based on information that corresponds to a class of communication. Alternatively or additionally, the stimuli may vary based on other factors. For example, all email notifications may cause a tactile stimulus, and all voicemails may cause a visual stimulus. If the email is from one's spouse, it may cause a rapid pulsation of tactile stimuli, wherein all other e-mails lead to a slower paced series of tactile sensations.

In another non-limiting example, a system may be designed in which a user receives three short pulses for communications received on a smartphone from the user's spouse and one long pulse for communications received on a smartphone from the user's parents. In an additional example, the user may have two short pulses and one long pulse for the user's children, with one of the pulses being stronger than the others, to indicate whether the older child or younger child is attempting to communicate with the user. In an additional example, the user may have one short pulse for social media notifications (such as "likes") and one long pulse for all phone calls. In certain embodiments, all communications that a telecommunication device receives from a particular person or group of persons, regardless of form (e.g., voicemail and email and texts) cause the transmission of instructions for the same stimulus. These foregoing examples are only a few of the myriad available when using the systems, methods and devices disclosed.

Control of Notifications Through Movement

In one embodiment, the mobile communication device is configured to measure and to track movement of itself through an accelerometer, gyroscope or other input device, to utilize this information to control how it interacts with the telecommunication device as well as with the user. For example, if the mobile communication device has been undisturbed for a period of time, it may not display notifications and may relay this dormancy information back to the telecommunication device. If through analysis of the movement or other analysis, the mobile communication device determines that the user is performing a certain activity, e.g., walking, typing, etc. then it may relay this information back to the telecommunication device, and may alter the operation of either or both the wearable device and the mobile device. For example, if the user is outside and running, the device will not relay alerts, so as not to distract him or her but may relay the alerts if the user stops to take a break.

Analysis of information from these and other input devices may be done in one of two ways. In some embodiments, all information that is collected locally by the mobile communication device is transmitted to a telecommunication device and analysis is performed on the telecommunication device to which the information is transmitted or to another device contacted by the telecommunication device. In other embodiments, the information is collected and analyzed locally and either the conclusion is transmitted to the telecommunication device, which changes its actions based on the conclusions from the analysis or the conclusion is retained locally and mobile communication device changes its actions based on the conclusions from the analyses.

Tracking Behavioral Gestures and Sound

The mobile communication device may contain an accelerometer, gyroscope or image-based gesture recognition feature, such as a digital camera and software that is capable of tracking physical movements of a user through acceleration, context and/or location. After the device captures a gestural type it can send alerts to the user (lights, vibrations, sounds) to communicate that the behavior is understood, e.g., raising the user's hand. The user can set specific color or vibration patterns that will alert the user as the behavior type is performed.

In another example, if a user is trying to quit smoking, he or she can set up the device to pulse and flash a light if his/her movement is interpreted as smoking a cigarette. The mobile communication device can also be connected to a sound recording device, or act as a sound recording device in which case it may contain a microphone. The mobile communication device can process audio and send alerts to the user based on different settings. For example, to improve speech, the mobile communication device can notify the user (through vibration, lights or other) if he/she says the word "um" or used a run-on sentence or another pattern of behavior that is desired to be recognized. Other examples include OCD tics/movements, nervous behaviors, nail biting, hair twirling, scratching, chewing of non-food items, hair pulling, etc.

Reinforcing Behaviors

In some embodiments, the mobile communication device may reward the user for completing a task as detected by a beneficial modem, by e.g., displaying a green light. Alternatively, the device may alert or remind the user that the task has not been done, e.g., taking medication, feeding a pet, emptying the trash, etc. by e.g., displaying a red light. The alerts may be in response to actions by the user or by another person or application.

By way of a non-limiting example, a positive visual stimulus, such as a rainbow light pattern, may be displayed after the mobile communication device or a remote device concludes that a predetermined positive act such as a particular movement in three dimensional space, has been performed. In another non-limiting example, the device may track movement, send the data or conclusion of a particular movement to device under the control of another party, and thereby provide the other party with the opportunity to select whether to cause the device to display a particular stimulus that symbolizes a reward, and if so, which one.

Lights (and motors) can also provide feedback to the user, e.g., if a user successfully makes a gesture as measured by an input device described below, it might flash or vibrate.

Recommendations Based on Sensors

In some embodiments, the mobile communication device contains multiple sensors that collect biometric data and communicate back to a telecommunication device or interact with other wireless or non-wireless devices. In various embodiments, the systems, methods, and devices disclosed herein may have biological data sensors that track body temperature, vitamin levels, heart rate, sweat levels, anxiety, stress, blood pressure, insulin, or any other biological metric. These embodiments may use any biometric sensor known to the art.

For example, a mobile communication device may be configured to track a user's body temperature through a temperature sensor and communicate with a user's thermostat to change the temperature in the user's home.

In other embodiments, the device can be configured to collect and to use pulse oximetry or galvanic skin response to calculate and determine stress and excitement levels that will then communicate with a telecommunication device or other devices in a user's home to recommend how to improve his/her current mental state. For example, if a mobile communication device determines that a user is stressed, it can recommend foods to eat, movies to watch, music to which to listen, exercises to do, etc. The mobile communication device may display the recommendation to the user who is wearing or associated with the device by for example, displaying a particular stimulus or combination of stimuli and/or transferring the recommendation to an app on the user's telecommunications device, e.g., smart phone.

Parse the Words/Messages/Text, to Understand the Importance of the Message and Relate the Notification in a Different Way Based on the contents and interpreted context of messages, the wearable device may respond differently. For example, if an email is from a known work associate, based on the time and location of the user, the notification may respond differently depending on the user preference. Additionally or alternatively, if the user were determined through location tracking at a location other than work or home or other user specified location, a text saying "where are you?" may trigger a different response than if the user were determined to be at one of those locations. In other embodiments, a text containing more urgent context was parsed, e.g., "call me now" may trigger a different response than one with "hi." In some embodiments, all analyses that determine which stimuli to display are located on a smartphone or network or other remote transmitting device.

Notification Relevance and Context Aware Notifications

A mobile communication device of the present invention can also be configured to record and/or to determine different contexts or situations of the user and set different settings based on those specific contexts. For example, the device can use location and time to determine that the user is in "work" mode and send different notification settings on the mobile communication device.

In some embodiments, the mobile communication device collects data from which to analyze the location and transmits this information to a smartphone or network and the smartphone or network analyzes this information to determine if the person is at work, also considering, for example, the time at which and the location from which information was sent. The smartphone or network then uses this information as a filter pursuant to rules selected by the user in order to determine whether to translate information that calls for display of a stimulus.

In an alternative embodiment, all of the information may be collected and analyzed on the mobile communication device, and that device would either transmit the conclusion of the location to the network or smartphone to apply the filter. In another alternative embodiment, all of the information may be collected and analyzed on the mobile communication device, but the mobile communication device itself would apply the filter.

Multiple Gestural Inputs can Provide Further Motion Context

In one embodiment, multiple wearable devices are utilized to obtain gestural information. Analysis of this information can provide additional discrimination of the intended motion. For example, one may employ a plurality of rings and one or more bracelets and optionally a necklace or one or more earrings each of which has an accelerometer and/or gyroscope. Information from these devices may be collected and transmitted to a telecommunication device and processed there.

Metadata of Physical Things and Locations

Either through NFC or iBeacon technology (or similar technologies), one can use a mobile communication device of the present invention to save the metadata for an item, place, experience or piece of content. For example, if a user were shopping in a store that has NFC tags or beacon technology throughout the store, the user can tap his or her wireless accessory to a location or item, or select an input on the accessory, to save that item's metadata to a digital application or unlock content about that item on his/her mobile communication device. Automatically or on command from the user, the metadata may be transferred directly or indirectly through the telecommunication device to a remote location, such as a server for processing.

Security

In various embodiments, the mobile communication devices have one or more security features that prevent unauthorized users from receiving notifications. These security features may be implemented on the device and/or system level.

For example, on the device level there may be a requirement of insertion of a code through a pattern of tapping the device. Alternatively, there may be a voice recognition requirement through analysis of sound that has been input through a microphone on the device. In still further embodiments there may be a security feature that requires recognition of a fingerprint.

In these or other embodiments, the security features may be implemented on a network level. For example, a user may maintain an account on a server or in the cloud that permits the user to activate and to inactivate one or more mobile communication devices of the present invention.

Various embodiments of the present invent may be further understood by reference to the accompanying figures. FIG. 1 shows an embodiment of a mobile communication device of the present invention. It comprises a signaling assembly 110 that comprises a microcontroller 112 and a printed circuit board 106. Also shown are a battery 108 and a vibration motor 104. The signaling assembly is shown separate from, but may be incorporated into an accessory such as a ring 102.

Figure 6A:
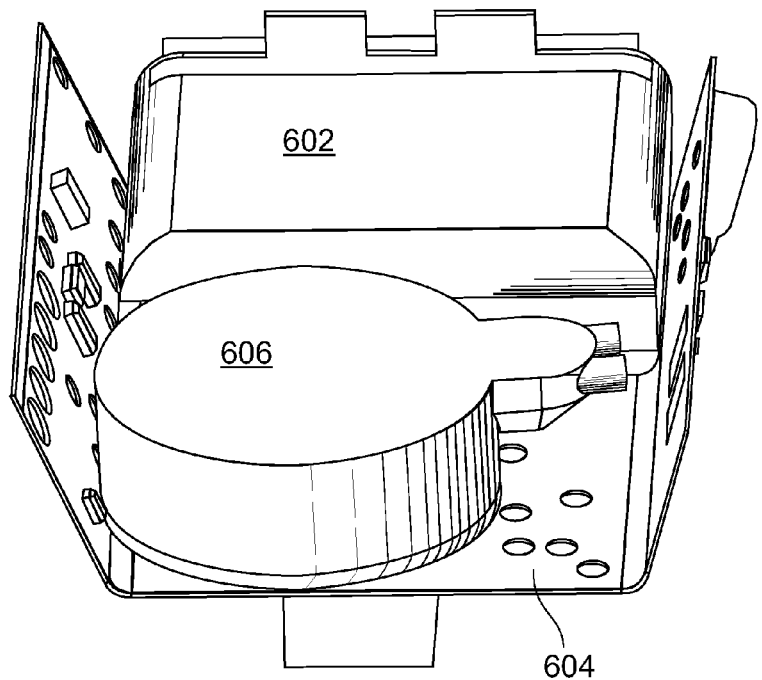
FIGS. 6A and 6B depict an example of a signaling assembly within a ring that is an embodiment of the present invention.
Figure 6B:
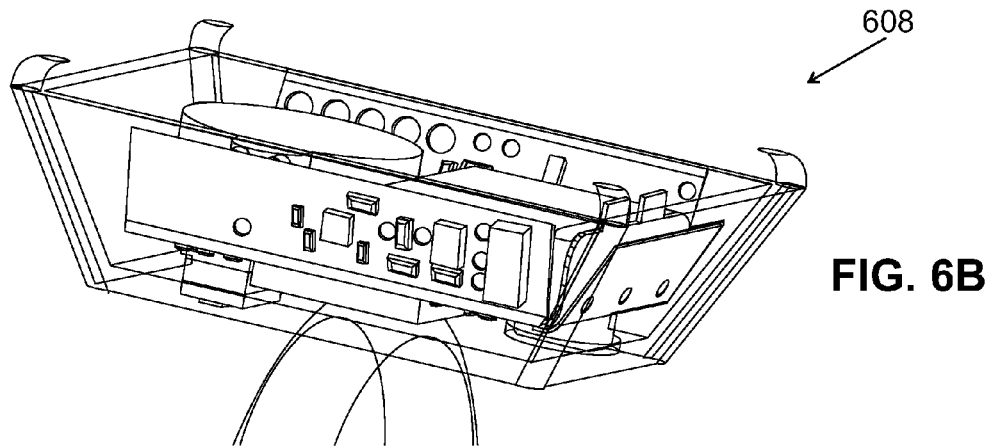

Components of the device may be stacked on one side or the other, e.g., on top of or underneath or on both sides of the PCB. As shown in FIGS. 6A and 6B, in one configuration the battery 602 and the vibration motor 606 are on the top side of the PCB 604. The battery, PCB, and vibration motor are also contained in e.g., a rectangular shaped containment compartment 608. The form of the containment compartment may be determined by aesthetic preferences, or any other desired benefit. This "stacked" embodiment conserves space when manufactured.

The PCB used in various embodiments may route all of the necessary electrical connections required between components of the embodiment. FIGS. 4A and 4B depict an example of a printed circuit board that may be used in the mobile communication device. The components may include, but are not limited to, an antenna 405, a microcontroller 404, signaling assembly 408, a set of capacitors 402, resistors 406, a timing devices 410 and an accelerometer 409. In various embodiments, additional components may be included and mounted on the PCB. As shown, the components of the PCB may be mounted on both sides of it, i.e., the back side 400, and the front side 401. By placing components on both sides of the PCB, one may conserve space.

In various embodiments, the PCB is comprised of multiple surfaces. Vias may be used with surface mounted components in order maintain a small PCB size. Vias may for example, be created through drilling or laser cutting. As currently known to the art, most PCBs are flat and spread out to fit all of their components.

Figure 7:
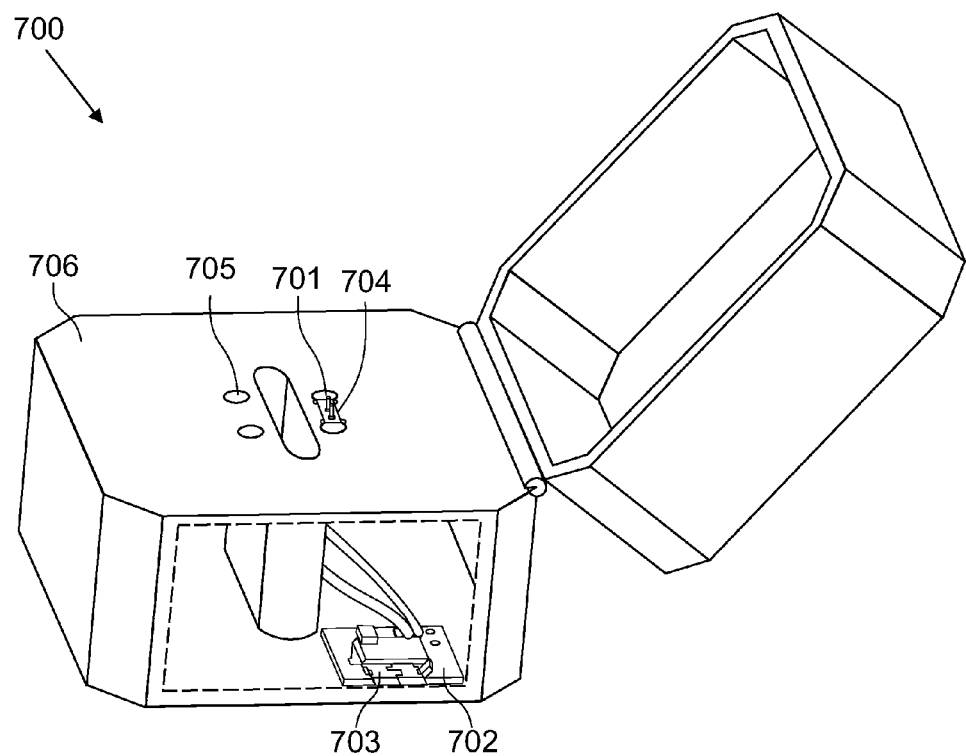
FIG. 7 depicts an example of a charging station.

FIG. 7 shows a charging station of a system of the present invention. The charging station 700 is in the form of a ring box and contains a charging circuit 702 with an external micro USB port 703. There are magnets 701 and a small component (pogo pins) 704 on the charging base 706 that are capable of connecting to the contacts and magnets on the mobile communication device. There are also magnets 705 on the charging base that will repel the mobile communication device if the device is inserted in the improper direction. Once the mobile communication device's charging contacts come in contact with the pogo pins 704 on the charging base 706 the mobile communication device will begin being charged and optionally, the LED on the mobile communication device will turn on to indicate whether the device is fully charged. In a non-limiting example a red color for the LED indicates a low battery and a green color for the LED indicates a fully-charged device.

Figure 3:
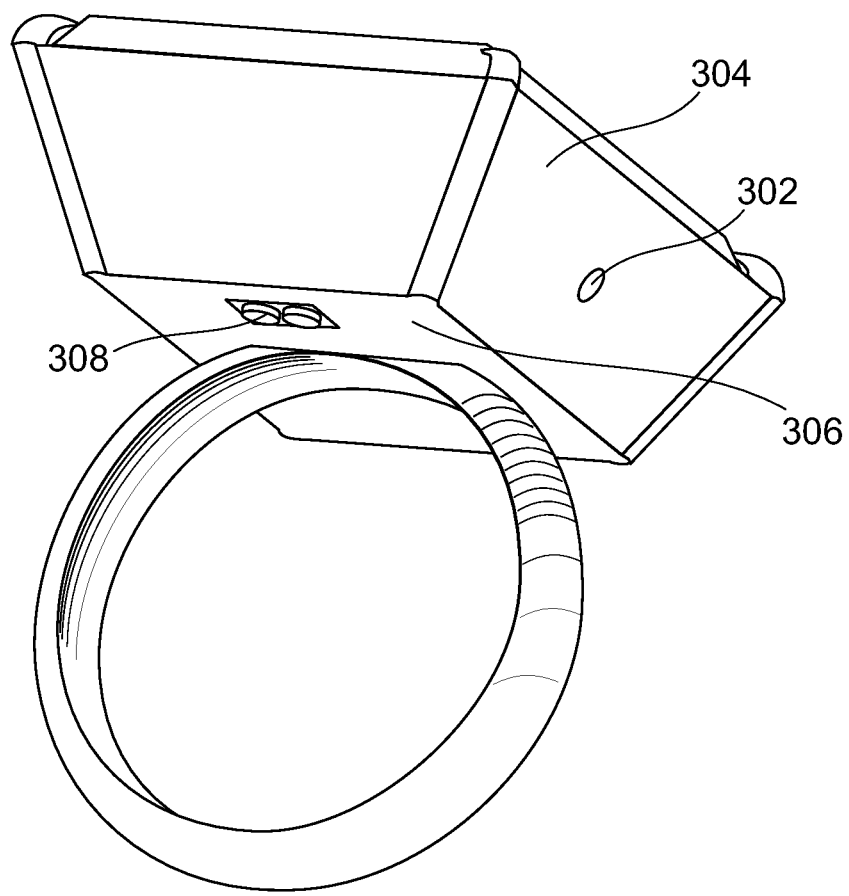
FIG. 3 depicts a piece of jewelry incorporating an embodiment of the present invention.

FIG. 3 shows a light source 302 situated on a fashion accessory that is a ring 304 that can provide a visual stimulus to a user. As shown in this figure, the light is emitted from an LED on the side of the ring and not from the face of the ring. The ring of FIG. 3 illustrates one particular configuration of certain embodiments. Here, one can see two magnets 308 emanating from a flat or substantially flat underside 306 of the head of the ring, which sits on top of the shank of the ring. A single LED light is shown for visual display on the truncated pyramid shaped head.

Referring to FIG. 2, the mobile communication device may be programmed to interact with software that controls it. The software may reside on a smartphone and FIG. 2 display activity on that device when carrying out various methods of the present invention. Thus, the smartphone may offer the option to connect with the mobile communication device 202. When contact is made, the smartphone enters a connecting mode 204. The smartphone may also monitor the battery level of the mobile communication device of the present invention 205. Using the mobile communication software, the user may change the settings for types of alerts to be generated on the mobile communication device 206. The user may, for example, change the color of the light source to represent various notifications, change the vibration settings, and add features to correspond to various lights or vibrations including but not limited to, removing text message notifications.

Figures 8A, 8B:
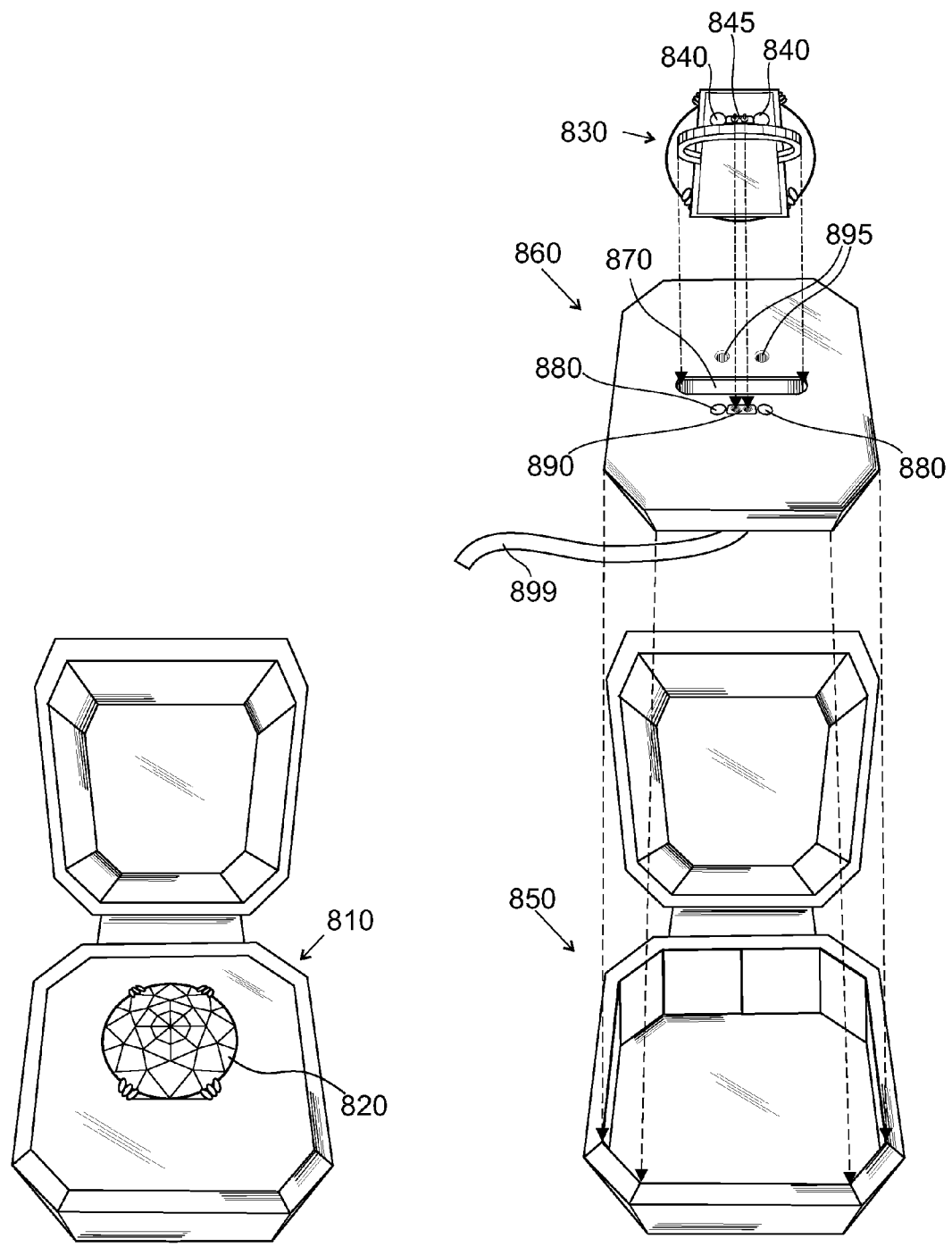
FIGS. 8A and 8B depict a ring within and outside of a charging station.

FIG. 8A shows a ring 820 in a charging station 810 that is designed to look like a ring box. FIG. 8B shows a ring removed from the charging station and the charging station removed from its housing. The ring 830 is shown from its underside, where two magnets 840 are visible. Between the two magnets' opposite poles is shown a contact 845. Also shown is a base of the jewelry box 850 configured to receive the ring and to house the charging station. For illustrative purposes, the figure shows a charging station 860 exploded from the bottom of the box. In the charging station as shown are a receptacle for the bottom of a ring 870 and magnets that have an orientation complementary to that on the ring 880. Between the magnets on the charging station is a pin or contact 890 that will allow for transfer of electricity to the ring. Notably, as shown, the charging station has a second set of magnets 895. The second set of magnets is oriented to repel the magnets of the ring so that the ring cannot be inserted in the incorrect orientation or a repulsion force will be felt as one tries to insert the ring in the incorrect orientation. Also shown is a micro A USB connector 899 for connections to a computer or other external source for the transfer of power and/or information to update the microcontroller on the device.

Figure 5:
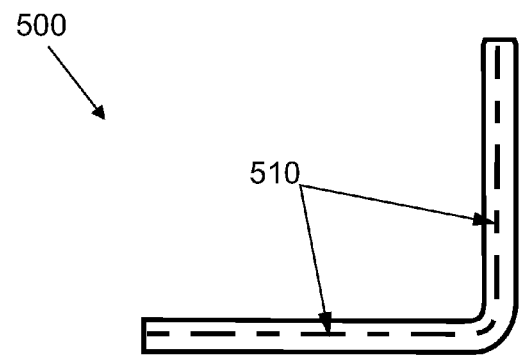
FIG. 5 is a representation of an antenna trace within a printed circuit board.

FIG. 5 shows an antenna trace 510 within a PCB 500. As shown, the antenna trace and the PCB bend, thereby allowing a longer trace within a smaller area.

Figure 9A:
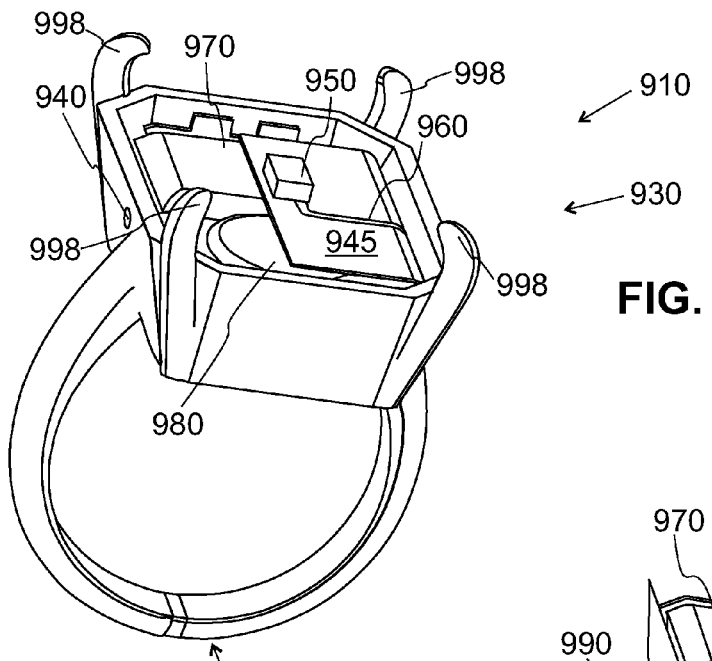
FIG. 9A depicts a mobile communication device that is a ring.

FIG. 9A depicts a mobile communication device 910 within a head 930 of a ring that is connected to the shank 920. On the exterior side of the ring is an LED aperture 940 that may have a cover, e.g., a light diffuser or translucent material such as cubic zirconium, diamond or glass. In some embodiments, the aperture is a light pipe and houses a jewel in which light can be shined from behind. When the signaling assembly is within the head of the ring as shown, a portion of the folded printed circuit board 945 covers the battery 970 and the motor 980. On top of the printed circuit board lies an antenna chip 950 and an antenna trace 960 that will run down the side of the PCB and thus traversing a plurality of planes. Not shown is a cover for the head of the ring, which may comprise, consist essentially of or consist of a semi-precious stone that is radio transparent. The cover may be held in place by prongs 998 and in some embodiments contain no metal.

Figure 9B:
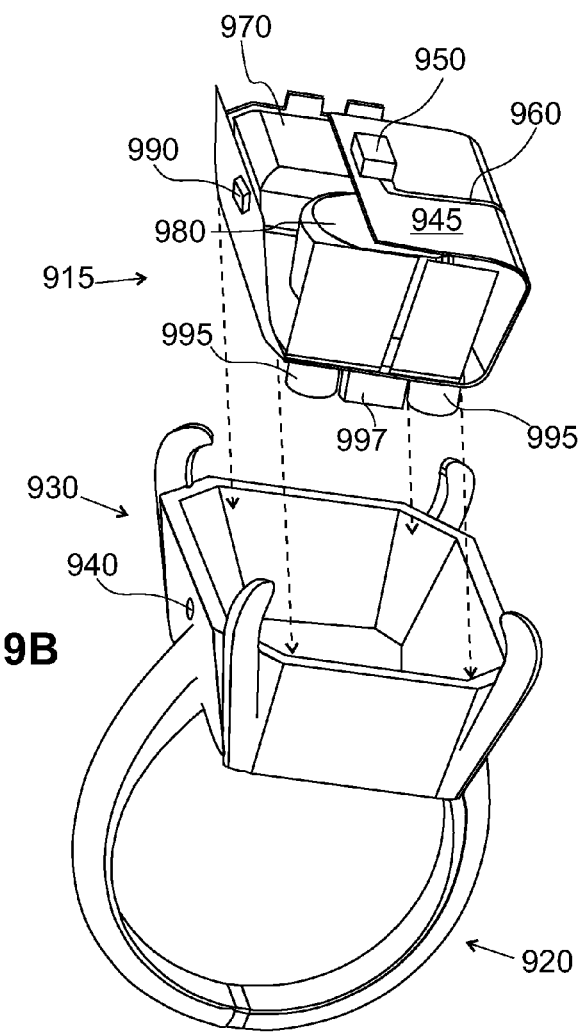
FIG. 9B depicts the signaling assembly as removed from the head of the ring.

FIG. 9B depicts the signaling assembly 915 as removed from the head of the ring showing the shank 920 attached to the head 930, which has a LED aperture 940 that may have a cover. As with FIG. 9A, this signaling assembly shows the folded printed circuit board 945, with the antenna chip 950 and antenna trace 960, as well as the battery 970 and the motor 980. Positioned to show through the LED aperture is the LED 990. Also shown are magnets 995 and contact 997, which may be present in some embodiments in which the device is rechargeable.

Various aspects of the present invention have been described for use in connection with one or more embodiments. However, unless explicitly stated or otherwise apparent from context, each feature described above in any one embodiment may be used in connection with any and all embodiments.

What is claimed is:

1. A mobile communication device comprising:
   (a) a fashion accessory, wherein the fashion accessory is a ring, wherein the ring comprises a head and a shank, wherein the head comprises a base, and the base is adjacent to the shank; and
   (b) a signaling assembly, wherein the signaling assembly comprises a light emitting diode, wherein the light emitting diode is capable of emitting light for a duration of time to create a visual display and said light emitting diode is capable of existing in an off state, wherein when in said off state, said light emitting diode does not emit light, and the signaling assembly is housed within or affixed to the fashion accessory and is capable of generating a plurality of different sensory stimuli, wherein the different sensory stimuli are based on receipt of different communications from a remote transmitting device, and wherein at least one of the sensory stimuli is the visual display,
   wherein the head further houses a stone, wherein the fashion accessory is configured to show the stone both when the light emitting diode emits light and when the light emitting diode is in the off state.

2. The mobile communication device of claim 1 further comprising a magnet and a contact that is capable of conducting electricity.

3. The device of claim 2 further comprising a printed circuit board and an antenna, wherein the antenna is located between the printed circuit board and the stone and the stone is displayed through an upper face of the fashion accessory, wherein the upper face is located on a side of the fashion accessory opposite to the base.

4. The device of claim 3, wherein the stone is a semi-precious stone and the semi-precious stone is radio transparent or radio translucent.

5. The device of claim 3, wherein the device further comprises a gyroscope.

6. The device of claim 3, wherein the visual display is a first sensory stimulus and the plurality of sensory stimuli comprises a second sensory stimulus, wherein the second sensory stimulus is a vibratory signal.

7. The device of claim 3, wherein the antenna has an antenna trace and the antenna trace follows a non-linear path, wherein the non-linear path comprises at least one bend.

8. The device of claim 7, wherein the printed circuit board comprises a fold.

9. The device of claim 7, wherein the signaling assembly comprises a printed circuit board and the antenna trace lies in an interior plane of the printed circuit board within a neutral axis.

10. The device of claim 1, wherein the LED light is visible through a side of the head.

11. The device of claim 1 further comprising an accelerometer.

12. The device of claim 11 further comprising a near field communication device.

13. The device of claim 11 further comprising at least one of a speaker, a microphone, an LCD screen and a galvanic skin response detector.

14. The device of claim 1, wherein the stone is selected from the group consisting of black onyx, amethyst, labradorite, malachite, garnet, citrine, opal, lapis, tiger's eye, jasper, carnelian, aquamarine, moonstone, jade, peridot, sodalite, topaz, and turquoise.

15. The device of claim 1, wherein the device is configured to emit the plurality of different sensory stimuli through the light emitting diode and at least two different sensory stimuli that are emitted through said light emitting diode differ from each other by at least one of color, duration of display, or order of visual signals.

16. A system for charging an apparatus comprising:
   (i) a device, wherein the device comprises a fashion accessory, wherein the fashion accessory is a ring, wherein the ring comprises a head and a shank, wherein the head comprises a base, and the base is adjacent to the shank; a signaling assembly, wherein the signaling assembly comprises a light emitting diode, wherein the light emitting diode is capable of emitting light for a duration of time to create a visual display and said light emitting diode is capable of existing in an off state, wherein when in said off state, said light emitting diode does not emit light, and the signaling assembly is housed within or affixed to the fashion accessory and is capable of generating a plurality of different sensory stimuli, wherein the different sensory stimuli are based on receipt of different communications from a remote transmitting device, and wherein at least one of the sensory stimuli is the visual display; and a magnet and a contact, wherein the contact is capable of conducting electricity, wherein the head further houses a stone, wherein the fashion accessory is configured to show the stone both when the light emitting diode emits light and when the light emitting diode is in the off state; and (ii) a charging station, wherein the charging station is configured to reversibly engage the device at the contact and said charging station comprises a magnet, wherein said magnet of the charging station will repel the device if the device is oriented in a manner inconsistent with charging of said device and said charging station comprises or is configured to engage a power source.

17. The system of claim 16, wherein the charging station is a box configured to hold the ring and the box has a cavity, wherein the cavity is configured to receive at least a portion of the shank of the ring.

18. The system of claim 17, wherein the contact is located on the base of the head.

19. A system for charging an apparatus comprising:
(i) a device, wherein the device comprises a fashion accessory, wherein the fashion accessory is a ring, wherein the ring comprises a head and a shank, wherein the head comprises a base, and the base is adjacent to the shank; a signaling assembly, wherein the signaling assembly comprises a light emitting diode, wherein the light emitting diode is capable of emitting light for a duration of time to create a visual display and said light emitting diode is capable of existing in an off state, wherein when in said off state, said light emitting diode does not emit light, and the signaling assembly is housed within or affixed to the fashion accessory and is capable of generating a plurality of different sensory stimuli, wherein the different sensory stimuli are based on receipt of different communications from a remote transmitting device, and wherein at least one of the sensory stimuli is the visual display; and a magnet and a contact, wherein the contact is capable of conducting electricity, wherein the head further houses a stone, wherein the fashion accessory is configured to show the stone both when the light emitting diode emits light and when the light emitting diode is in the off state; and (ii) a charging station, wherein the charging station is configured to reversibly engage the device at the contact and said charging station comprises a magnet, wherein said magnet of the charging station will exert an attractive force on the device if the device is oriented in a manner consistent with charging of said device and wherein said charging station comprises or is configured to engage a power source.

20. The system of claim 19, wherein the charging station is a box configured to hold the ring and the box has a cavity, wherein the cavity is configured to receive at least a portion of the shank of the ring.

\* \* \* \* \*